US006849392B2

(12) United States Patent
Lynch et al.

(10) Patent No.: US 6,849,392 B2

(45) Date of Patent: Feb. 1, 2005

(54) THERMALLY DEVELOPABLE EMULSIONS AND MATERIALS CONTAINING TRIAZINE-THIONE COMPOUNDS

(75) Inventors: Doreen C. Lynch, Afton, MN (US); Stacy M. Ulrich, Dresser, WI (US); Paul G. Skoug, Stillwater, MN (US)

(73) Assignee: Eastman Kodak Company, Rochester, NY (US)

( * ) Notice: Subject to any disclaimer, the term of this patent is extended or adjusted under 35 U.S.C. 154(b) by 15 days.

(21) Appl. No.: 10/732,955

(22) Filed: Dec. 11, 2003

(65) Prior Publication Data

US 2004/0137382 A1 Jul. 15, 2004

Related U.S. Application Data

(62) Division of application No. 10/341,754, filed on Jan. 14, 2003, now Pat. No. 6,703,191.

(51) Int. Cl.$^{7}$ .......................... G03C 5/16; G03C 1/498; G02E 1/00; B41M 5/20

(52) U.S. Cl. ....................... 430/348; 600/603; 600/611; 600/619; 600/620; 600/964; 600/965; 252/583; 503/201

(58) Field of Search ................................ 430/620, 619, 430/350, 567, 600, 611, 613, 964, 603, 965, 348; 252/583, 391; 503/201

(56) References Cited

U.S. PATENT DOCUMENTS

| | | | | |
|---|---|---|---|---|
| 3,832,184 A | | 8/1974 | Masuda et al. | |
| 4,105,451 A | | 8/1978 | Smith et al. | |
| 4,201,582 A | | 5/1980 | White | |
| 4,245,033 A | | 1/1981 | Eida et al. | |
| 4,451,561 A | | 5/1984 | Hirabayashi et al. | |
| 4,631,138 A | * | 12/1986 | Johns et al. | 507/243 |
| 4,724,196 A | | 2/1988 | Shoji et al. | |
| 4,971,899 A | * | 11/1990 | Gallo et al. | 430/596 |
| 5,149,620 A | | 9/1992 | Simpson et al. | |
| 5,427,905 A | | 6/1995 | Freedman et al. | |
| 5,656,419 A | | 8/1997 | Toya et al. | |
| 5,712,081 A | | 1/1998 | Andriessen et al. | |
| 6,027,872 A | | 2/2000 | Suzuki et al. | |
| 6,146,822 A | | 11/2000 | Asanuma et al. | |
| 6,214,533 B1 | | 4/2001 | Ho et al. | |
| 6,348,308 B1 | | 2/2002 | Loccufier et al. | |
| 6,368,779 B1 | | 4/2002 | Lynch et al. | |
| 6,413,710 B1 | | 7/2002 | Shor et al. | |
| 6,413,711 B1 | | 7/2002 | Kimura | |
| 2002/0028414 A1 | | 3/2002 | Yanagisawa et al. | |

FOREIGN PATENT DOCUMENTS

| | | |
|---|---|---|
| DE | 199 20 354 A1 | 11/2000 |
| EP | 0 559 228 B1 | 8/1999 |
| JP | 9-160167 A | 6/1997 |
| JP | 11-43483 | 2/1999 |
| JP | 11-44928 | 2/1999 |
| JP | 11-44929 | 2/1999 |
| JP | 11-109548 | 4/1999 |
| JP | 11-295846 | 10/1999 |
| JP | 11-295849 | 10/1999 |
| JP | 2000-75438 | 3/2000 |
| JP | 2000-221630 | 8/2000 |
| JP | 11-5709 | 12/2000 |
| JP | 2001-56526 | 2/2001 |
| JP | 2001-100360 | 4/2001 |
| JP | 2002-214734 | 7/2002 |

OTHER PUBLICATIONS

JP Abstract 63–037368.

JP Abstract 03–056956.

* cited by examiner

*Primary Examiner*—Thorl Chea

(74) *Attorney, Agent, or Firm*—J. Lanny Tucker; Louis M. Leichter

(57) ABSTRACT

Thermally developable compositions such thermographic and photothermographic emulsions include certain triazine-thione compounds. These emulsions can be used in thermally developable materials such as thermographic and photothermographic materials to provide increased image density and shortened development time, and to allow development at lower temperatures. Such materials can have imaging layers on one or both sides of the support.

20 Claims, No Drawings

THERMALLY DEVELOPABLE EMULSIONS AND MATERIALS CONTAINING TRIAZINE-THIONE COMPOUNDS

CROSS-REFERENCE TO RELATED APPLICATION

This is a Divisional of application Ser. No. 10/341,754, filed Jan. 14, 2003, now, U.S. Pat. No. 6,703,191.

FIELD OF THE INVENTION

This invention relates to thermally developable compositions and imaging materials comprising certain triazine-thione compounds. In particular, the invention relates to thermographic and photothermographic materials containing the triazine-thione compounds. The invention also relates to methods of imaging the thermally developable materials.

BACKGROUND OF THE INVENTION

Silver-containing thermographic and photothermographic imaging materials (that is, thermally developable imaging materials) that are imaged and/or developed using heat and without liquid processing have been known in the art for many years.

Silver-containing thermographic imaging materials are non-photosensitive materials that are used in a recording process wherein images are generated by the use of thermal energy. These materials generally comprise a support having disposed thereon (a) a relatively or completely non-photosensitive source of reducible silver ions, (b) a reducing composition (usually including a developer) for the reducible silver ions, and (c) a suitable hydrophilic or hydrophobic binder.

In a typical thermographic construction, the image-forming layers are based on silver salts of long chain fatty acids. Typically, the preferred non-photosensitive reducible silver source is a silver salt of a long chain aliphatic carboxylic acid having from 10 to 30 carbon atoms. The silver salt of behenic acid or mixtures of acids of similar molecular weight are generally used. At elevated temperatures, the silver of the silver carboxylate is reduced by a reducing agent for silver ion such as methyl gallate, hydroquinone, substituted-hydroquinones, hindered phenols, catechols, pyrogallol, ascorbic acid, and ascorbic acid derivatives, whereby an image of elemental silver is formed. Some thermographic constructions are imaged by contacting them with the thermal head of a thermographic recording apparatus such as a thermal printer or thermal facsimile. In such constructions, an anti-stick layer is coated on top of the imaging layer to prevent sticking of the thermographic construction to the thermal head of the apparatus utilized. The resulting thermographic construction is then heated to an elevated temperature, typically in the range of from about 60 to about 225° C., resulting in the formation of an image.

Silver-containing photothermographic imaging materials are photosensitive materials that are used in a recording process wherein an image is formed by imagewise exposure of the photothermographic material to specific electromagnetic radiation (for example, X-radiation, or ultraviolet, visible, or infrared radiation) and developed by the use of thermal energy. These materials, also known as "dry silver" materials, generally comprise a support having coated thereon: (a) a photocatalyst (that is, a photosensitive compound such as silver halide) that upon such exposure provides a latent image in exposed grains that are capable of acting as a catalyst for the subsequent formation of a silver image in a development step, (b) a relatively or completely non-photosensitive source of reducible silver ions, (c) a reducing composition (usually including a developer) for the reducible silver ions, and (d) a hydrophilic or hydrophobic binder. The latent image is then developed by application of thermal energy.

In such materials, the photosensitive catalyst is generally a photographic type photosensitive silver halide that is considered to be in catalytic proximity to the non-photosensitive source of reducible silver ions. Catalytic proximity requires intimate physical association of these two components either prior to or during the thermal image development process so that when silver atoms $(Ag^0)_n$, also known as silver specks, clusters, nuclei, or latent image, are generated by irradiation or light exposure of the photosensitive silver halide, those silver atoms are able to catalyze the reduction of the reducible silver ions within a catalytic sphere of influence around the silver atoms [D. H. Klosterboer, *Imaging Processes and Materials*, (*Neblette's Eighth Edition*), J. Sturge, V. Walworth, and A. Shepp, Eds., Van Nostrand-Reinhold, New York, 1989, Chapter 9, pp. 279–291]. It has long been understood that silver atoms act as a catalyst for the reduction of silver ions, and that the photosensitive silver halide can be placed in catalytic proximity with the non-photosensitive source of reducible silver ions in a number of different ways (see, for example, *Research Disclosure*, June 1978, item 17029). Other photosensitive materials, such as titanium dioxide, cadmium sulfide, and zinc oxide have also been reported to be useful in place of silver halide as the photocatalyst in photothermographic materials [see for example, Shepard, *J. Appl. Photog. Eng.* 1982, 8(5), 210–212, Shigeo et al., *Nippon Kagaku Kaishi,* 1994, 11, 992–997, and FR 2,254,047 (Robillard)].

The photosensitive silver halide may be made "in situ," for example by mixing an organic or inorganic halide-containing source with a source of reducible silver ions to achieve partial metathesis and thus causing the in situ formation of silver halide (AgX) grains throughout the silver source [see, for example, U.S. Pat. No. 3,457,075 (Morgan et al.)]. In addition, photosensitive silver halides and sources of reducible silver ions can be coprecipitated [see Yu. E. Usanov et al., *J. Imag. Sci. Tech.* 1996, 40, 104]. Alternatively, a portion of the reducible silver ions can be completely converted to silver halide, and that portion can be added back to the source of reducible silver ions (see Yu. E. Usanov et al., International Conference on Imaging Science, 7–11 Sep. 1998).

The silver halide may also be "preformed" and prepared by an "ex situ" process whereby the silver halide (AgX) grains are prepared and grown separately. With this technique, one has the possibility of controlling the grain size, grain size distribution, dopant levels, and composition much more precisely, so that one can impart more specific properties to both the silver halide grains and the photothermographic material. The preformed silver halide grains may be introduced prior to and be present during the formation of the source of reducible silver ions. Co-precipitation of the silver halide and the source of reducible silver ions provides a more intimate mixture of the two materials [see for example U.S. Pat. No. 3,839,049 (Simons)]. Alternatively, the preformed silver halide grains may be added to and physically mixed with the source of reducible silver ions.

The non-photosensitive source of reducible silver ions is a material that contains reducible silver ions. Typically, the preferred non-photosensitive source of reducible silver ions is a silver salt of a long chain aliphatic carboxylic acid having from 10 to 30 carbon atoms, or mixtures of such salts. Such acids are also known as "fatty acids" or "fatty carboxylic acids." Silver salts of other organic acids or other organic compounds, such as silver imidazoles, silver tetrazoles, silver benzotriazoles, silver benzotetrazoles, silver benzothiazoles and silver acetylides may also be used. U.S. Pat. No. 4,260,677 (Winslow et al.) discloses the use of complexes of various inorganic or organic silver salts.

In photothermographic materials, exposure of the photographic silver halide to light produces small clusters containing silver atoms $(Ag^0)_n$. The imagewise distribution of these clusters, known in the art as a latent image, is generally not visible by ordinary means. Thus, the photosensitive material must be further developed to produce a visible image. This is accomplished by the reduction of silver ions that are in catalytic proximity to silver halide grains bearing the silver-containing clusters of the latent image. This produces a black-and-white image. The non-photosensitive silver source is catalytically reduced to form the visible black-and-white negative image while much of the silver halide, generally, remains as silver halide and is not reduced.

In photothermographic materials, the reducing agent for the reducible silver ions, often referred to as a "developer," may be any compound that, in the presence of the latent image, can reduce silver ion to metallic silver and is preferably of relatively low activity until it is heated to a temperature sufficient to cause the reaction. A wide variety of classes of compounds have been disclosed in the literature that function as developers for photothermographic materials. At elevated temperatures, the reducible silver ions are reduced by the reducing agent. In photothermographic materials, upon heating, this reaction occurs preferentially in the regions surrounding the latent image. This reaction produces a negative image of metallic silver having a color that ranges from yellow to deep black depending upon the presence of toning agents and other components in the imaging layer(s).

Differences between Photothermography and Photography

The imaging arts have long recognized that the field of photothermography is clearly distinct from that of photography. Photothermographic materials differ significantly from conventional silver halide photographic materials that require processing with aqueous processing solutions.

As noted above, in photothermographic imaging materials, a visible image is created by heat as a result of the reaction of a developer incorporated within the material. Heating at 50° C. or more is essential for this dry development. In contrast, conventional photographic imaging materials require processing in aqueous processing baths at more moderate temperatures (from 30° C. to 50° C.) to provide a visible image.

In photothermographic materials, only a small amount of silver halide is used to capture light and a non-photosensitive source of reducible silver ions (for example a silver carboxylate) is used to generate the visible image using thermal development. Thus, the imaged photosensitive silver halide serves as a catalyst for the physical development process involving the non-photosensitive source of reducible silver ions and the incorporated reducing agent. In contrast, conventional wet-processed, black-and-white photographic materials use only one form of silver (that is, silver halide) that, upon chemical development, is itself at least partially converted into the silver image, or that upon physical development requires addition of an external silver source (or other reducible metal ions that form black images upon reduction to the corresponding metal). Thus, photothermographic materials require an amount of silver halide per unit area that is only a fraction of that used in conventional wet-processed photographic materials.

In photothermographic materials, all of the "chemistry" for imaging is incorporated within the material itself. For example, such materials include a developer (that is, a reducing agent for the reducible silver ions) while conventional photographic materials usually do not. Even in so-called "instant photography," the developer chemistry is physically separated from the photosensitive silver halide until development is desired. The incorporation of the developer into photothermographic materials can lead to increased formation of various types of "fog" or other undesirable sensitometric side effects. Therefore, much effort has gone into the preparation and manufacture of photothermographic materials to minimize these problems during the preparation of the photothermographic emulsion as well as during coating, use, storage, and post-processing handling.

Moreover, in photothermographic materials, the unexposed silver halide generally remains intact after development and the material must be stabilized against further imaging and development. In contrast, silver halide is removed from conventional photographic materials after solution development to prevent further imaging (that is in the aqueous fixing step).

In photothermographic materials, the binder is capable of wide variation and a number of binders (both hydrophilic and hydrophobic) are useful. In contrast, conventional photographic materials are limited almost exclusively to hydrophilic colloidal binders such as gelatin.

Because photothermographic materials require dry thermal processing, they present distinctly different problems and require different materials in manufacture and use, compared to conventional, wet-processed silver halide photographic materials. Additives that have one effect in conventional silver halide photographic materials may behave quite differently when incorporated in photothermographic materials where the chemistry is significantly more complex. The incorporation of such additives as, for example, stabilizers, antifoggants, speed enhancers, supersensitizers, and spectral and chemical sensitizers in conventional photographic materials is not predictive of whether such additives will prove beneficial or detrimental in photothermographic materials. For example, it is not uncommon for a photographic antifoggant useful in conventional photographic materials to cause various types of fog when incorporated into photothermographic materials, or for supersensitizers that are effective in photographic materials to be inactive in photothermographic materials.

These and other distinctions between photothermographic and photographic materials are described in *Imaging Processes and Materials* (*Neblette's Eighth Edition*), noted above, *Unconventional Imaging Processes*, E. Brinckman et al. (Eds.), The Focal Press, London and New York, 1978, pp. 74–75, in Zou et al., *J. Imaging Sci. Technol.* 1996, 40, pp. 94–103, and in M. R. V. Sahyun, *J. Imaging Sci. Technol.* 1998, 42, 23.

Problem to be Solved

Photothermographic materials known in the art generally include one or more "toners" in an attempt to provide desired black tone and maximum image density ($D_{max}$). Conventional compounds used for this purpose include phthalimide, N-hydroxyphthalimide, cyclic imides, pyrazoline-5-ones, naphthalimides, cobalt complexes, N-(aminomethyl)aryldicarboximides, a combination of blocked pyrazoles, isothiuronium derivatives, merocyanine dyes, phthalazine and derivatives thereof, phthalazinone and phthalazinone derivatives, a combination of phthalazine (or derivatives thereof) plus one or more phthalic acid derivatives, quinazolinediones, benzoxazine or naphthoxazine derivatives, benzoxazine-2,4-diones, pyrimidines and asym-triazines, and tetraazapentalene derivatives.

Phthalazine or derivatives thereof have become the most common toners in photothermographic materials as described in U.S. Pat. No. 6,413,710 (Shor et al.) and U.S. Pat. No. 6,146,822 (Asamuma et al.).

U.S. Pat. No. 4,105,451 (Smith et al.) describes certain mercaptans such as 2,4-dimercaptopyrimidine as toners in photothermographic materials. U.S. Pat. No. 5,149,620 (Simpson et al.) similarly describes 3-mercapto-4,5-diphenyl-1,2,4-triazole compounds. U.S. Pat. No. 4,201,582 (White) describes 2,5-dimercapto-1,3,4-thiadiazole, 3-mercapto-1H-1,2,4-triazole, and 5-methyl-4-phenyl-3-mercapto-1,2,4-triazole as useful toners, while 4-phenyl-3-mercapto-1,2,4-triazole and 5-ethyl-4-phenyl-1,2,4-triazole are described to have disadvantages. U.S. Pat. No. 3,832,186 (Masuda et al.) describes the use of various mercaptotriazoles in combination with silver benzotriazole. 4-Phenyl-3-mercapto-1,2,4-triazole is also found in JP Kokai 44-026582 (Okubo) in a film that requires the use of a compound that releases base by heating. Amino and amido substituted mercaptotriazole toners are described in JP Kokai [1990] 2-179236 (Masukawa et al.) and U.S. Pat. No. 4,451,561 (Hirabayshi et al.).

There remains a need for toners that contribute to image density and shorter development time and that allow for development at lower processing temperature, especially in aqueous-based photothermographic materials.

SUMMARY OF THE INVENTION

The present invention provides a thermally developable composition comprising a non-photosensitive source of reducible silver ions, a reducing agent composition for the reducible silver ions, and a triazine-thione compound represented by the following Structure (I):

(I)

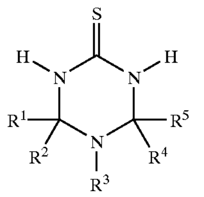

wherein $R^1$, $R^2$, $R^3$, $R^4$, and $R^5$ individually represent a substituent attached to the triazine-thione ring by a single bond.

This invention also provides a thermally developable material comprising a support and having thereon at least one thermally developable layer, and comprising a triazine-thione compound represented by the Structure (I) noted above.

Moreover, a black-and-white thermographic material of the present invention comprises a support having thereon one or more thermally-developable imaging layers comprising a binder and in reactive association, a non-photosensitive source of reducible silver ions, and a reducing composition for the non-photosensitive source of reducible silver ions, and a triazine-thione compound represented by the Structure (I) noted above.

This invention also provides a photothermographic material that comprises a support having thereon one or more thermally developable imaging layers comprising a binder and in reactive association, a photosensitive silver halide, a non-photosensitive source of reducible silver ions, a reducing composition for the non-photosensitive source reducible silver ions, and a triazine-thione compound represented by Structure (I) noted above.

Preferred embodiments of the present invention include a black-and-white aqueous-based photothermographic material that comprises a transparent support having a front side thereof:

a) one or more thermally developable imaging layers each comprising a hydrophilic binder, and in reactive association,
   - a preformed photosensitive silver bromide or silver iodobromide provided in predominantly as tabular grains,
   - a non-photosensitive source of reducible silver ions that includes one or more silver salts of a compound containing an imino group at least one of which is silver salt of benzotriazole,
   - a reducing composition for the non-photosensitive source reducible silver ions that includes at least one hindered phenol or an ascorbic acid, and b) a protective overcoat disposed over the one or more thermally developable imaging layers,
   - wherein the one or more thermally developable imaging layers further comprises a triazine-thione compound represented by Structure (I) noted above.

Other embodiments of the present invention include photothermographic materials that comprise a support having on a frontside thereof, one or more frontside thermally developable imaging layers comprising a binder and in reactive association, a photosensitive silver halide, a non-photosensitive source of reducible silver ions, a reducing composition for the non-photosensitive source reducible silver ions, and a triazine-thione compound represented by the following Structure (I):

(I)

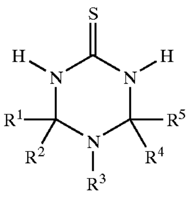

wherein $R^1$, $R^2$, $R^3$, $R^4$, and $R^5$, independently represent a substituent attached to the triazine-thione ring by a single bond, the materials comprising on the backside of the support, one or more backside thermally developable imaging layers comprising a binder and in reactive association, a photosensitive silver halide, a non-photosensitive source of reducible silver ions, a reducing composition for the non-photosensitive source reducible silver ions, and a triazine-thione compound represented by the following Structure (I):

(I)

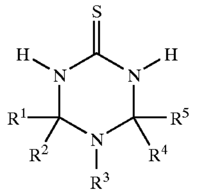

wherein $R^1$, $R^2$, $R^3$, $R^4$, and $R^5$, independently represent a substituent attached to the triazine-thione ring by a single bond, the frontside and backside thermally developable layers and compounds of Structure (I) in the frontside and backside layers having the same or different compositions.

In addition, the present invention provides a method of forming a visible image comprising:

A) thermal imaging of the thermally developable material of the present invention.

Where the thermally developable material comprises a transparent support, this image-forming method can further comprise:

B) positioning the thermally imaged thermally developable material between a source of imaging radiation and an imageable material that is sensitive to the imaging radiation, and
C) exposing the imageable material to the imaging radiation through the visible image in the thermally imaged thermographic material to provide an image in the imageable material.

In addition, the present invention provides a method of forming a visible image comprising:

A) imagewise exposing a photothermographic material of the present invention to electromagnetic radiation to form a latent image, and
B) simultaneously or sequentially, heating the exposed photothermographic material to develop the latent image into a visible image.

Where the photothermographic material comprises a transparent support, this image-forming method can further comprise:

C) positioning the exposed and heat-developed photothermographic material with the visible image therein between a source of imaging radiation and an imageable material that is sensitive to the imaging radiation, and
D) exposing the imageable material to the imaging radiation through the visible image in the exposed and heat-developed photothermographic material to provide an image in the imageable material.

In addition, the present invention provides an imaging assembly comprising the photothermographic material of the present invention that is arranged in association with one or more phosphor intensifying screens. In these embodiments, the photothermographic material may include one or more thermally developable layers on both sides of the support.

The present invention provides a number of advantages with the use of the triazine-thione compounds defined herein. They can be used in a variety of thermally developable materials including aqueous-based and solvent-based thermographic and photothermographic materials. They are particularly useful in aqueous-based photothermographic materials wherein the organic silver salt is a salt of a compound containing an imino group (such as silver benzotriazole) and have been observed to provide increased image density and shortened development time, and to allow development at relatively lower temperatures.

DETAILED DESCRIPTION OF THE INVENTION

The thermally developable materials of this invention include both thermographic and photothermographic materials. While the following discussion will often be directed to the preferred photothermographic embodiments, it would be readily understood by one skilled in the imaging arts that thermographic materials can be similarly constructed (using one or more imaging layers) and used to provide black-and-white or color images using non-photosensitive silver salts, reducing compositions, binders, and other components known to be used in such embodiments.

The thermographic and photothermographic materials of this invention can be used in black-and-white or color thermography and photothermography and in electronically generated black-and-white or color hardcopy recording. They can be used in microfilm applications, in radiographic imaging (for example digital medical imaging), X-ray radiography, and in industrial radiography. Furthermore, the absorbance of these thermally developable materials between 350 and 450 nm is desirably low (less than 0.5), to permit their use in the graphic arts area (for example, imagesetting and phototypesetting), in the manufacture of printing plates, in contact printing, in duplicating ("duping"), and in proofing.

The thermographic and photothermographic materials of this invention are particularly useful for medical imaging of human or animal subjects in response to visible or X-radiation. Such applications include, but are not limited to, thoracic imaging, mammography, dental imaging, orthopedic imaging, general medical radiography, therapeutic radiography, veterinary radiography, and auto-radiography When used with X-radiation, the photothermographic materials of this invention may be used in combination with one or more phosphor intensifying screens, with phosphors incorporated within the photothermographic emulsion, or with a combination thereof. The materials of this invention are also useful for non-medical uses of visible or X-radiation (such as X-ray lithography and industrial radiography).

The photothermographic materials of this invention can be made sensitive to radiation of any suitable wavelength. Thus, in some embodiments, the materials are sensitive at ultraviolet, visible, infrared, or near infrared wavelengths, of the electromagnetic spectrum. In other embodiments, they are sensitive to X-radiation. Increased sensitivity to a particular region of the spectrum is imparted through the use of various sensitizing dyes.

The photothermographic materials of this invention are also useful for non-medical uses of visible or X-radiation (such as X-ray lithography and industrial radiography). In such imaging applications, it is particularly desirable that the photothermographic materials be "double-sided" and have photothermographic coatings on both sides of the support.

In the photothermographic materials of this invention, the components needed for imaging can be in one or more layers. The layer(s) that contain the photosensitive photocatalyst (such as a photosensitive silver halide) or the non-photosensitive source of reducible silver ions, or both, are referred to herein as photothermographic emulsion layer(s). The photocatalyst and the non-photosensitive source of reducible silver ions are in catalytic proximity (that is, in reactive association with each other) and preferably are in the same emulsion layer.

Similarly, in the thermographic materials of this invention, the components needed for imaging can be in one or more layers. The layer(s) that contain the non-photosensitive source of reducible silver ions are referred herein as thermographic emulsion layer(s).

Where the materials contain imaging layers on one side of the support only, various non-imaging layers are usually disposed on the "backside" (non-emulsion or non-imaging side) of the materials, including antihalation layer(s), protective layers, antistatic layers, conducting layers, and transport enabling layers.

In such instances, various non-imaging layers can also be disposed on the "frontside" or imaging or emulsion side of the support, including protective topcoat layers, primer layers, interlayers, opacifying layers, antistatic layers, antihalation layers, acutance layers, auxiliary layers, and other layers readily apparent to one skilled in the art.

For some embodiments of photothermographic materials containing imaging layers on both sides of the support, such material can also include one or more protective topcoat layers, primer layers, interlayers, antistatic layers, acutance layers, antihalation layers, auxiliary layers, anti-crossover layers, and other layers readily apparent to one skilled in the art on either or both sides of the support.

When the thermographic and photothermographic materials of this invention are heat-developed as described below in a substantially water-free condition after, or simultaneously with, imagewise exposure, a silver image (preferably a black-and-white silver image) is obtained.

Definitions

As used herein:

In the descriptions of the photothermographic materials of the present invention, "a" or "an" component refers to "at least one" of that component [for example, the triazinethione compounds of Structure (I)].

Heating in a substantially water-free condition as used herein, means heating at a temperature of from about 50° C. to about 250° C. with little more than ambient water vapor present. The term "substantially water-free condition" means that the reaction system is approximately in equilibrium with water in the air and water for inducing or promoting the reaction is not particularly or positively supplied from the exterior to the material. Such a condition is described in T. H. James, *The Theory of the Photographic Process*, Fourth Edition, Eastman Kodak Company, Rochester, N.Y., 1977, p. 374.

"Thermographic material(s)" means a construction comprising at least one thermographic emulsion or imaging layer or a set of imaging layers (wherein the source of reducible silver ions is in one layer and the other essential components or desirable additives are distributed, as desired, in an adjacent coating layer) and any supports, topcoat layers, image-receiving layers, blocking layers, and subbing or priming layers. These materials also include multilayer constructions in which one or more imaging components are in different layers, but are in "reactive association" so that they readily come into contact with each other during thermal imaging and development. For example, one layer can include the non-photosensitive source of reducible silver ions and another layer can include the reducing composition, but the two reactive components are in reactive association with each other.

"Photothermographic material(s)" means a construction comprising at least one photothermographic emulsion layer or a photothermographic set of layers (wherein the photosensitive silver halide and the source of reducible silver ions are in one layer and the other essential components or desirable additives are distributed, as desired, in the same layer or in an adjacent coating layer) as well as any supports, topcoat layers, image-receiving layers, blocking layers, antihalation layers, subbing or priming layers. These materials also include multilayer constructions in which one or more imaging components are in different layers, but are in "reactive association" so that they readily come into contact with each other during imaging and/or development. For example, one layer can include the non-photosensitive source of reducible silver ions and another layer can include the reducing composition, but the two reactive components are in reactive association with each other.

When used in photothermography, the term, "imagewise exposing" or "imagewise exposure" means that the material is imaged using any exposure means that provides a latent image using electromagnetic radiation. This includes, for example, by analog exposure where an image is formed by projection onto the photosensitive material as well as by digital exposure where the image is formed one pixel at a time such as by modulation of scanning laser radiation.

When used in thermography, the term, "imagewise exposing" or "imagewise exposure" means that the material is imaged using any means that provides an image using heat. This includes, for example, by analog exposure where an image is formed by differential contact heating through a mask using a thermal blanket or infrared heat source, as well as by digital exposure where the image is formed one pixel at a time such as by modulation of thermal print-heads.

"Catalytic proximity" or "reactive association" means that the materials are in the same layer or in adjacent layers so that they readily come into contact with each other during thermal imaging and development.

"Emulsion layer," "imaging layer," "thermographic emulsion layer," or "photothermographic emulsion layer," means a layer of a thermographic or photothermographic material that contains the photosensitive silver halide (when used) and/or non-photosensitive source of reducible silver ions. It can also mean a layer of the thermographic or photothermographic material that contains, in addition to the photosensitive silver halide (when used) and/or non-photosensitive source of reducible ions, additional essential components and/or desirable additives. These layers are usually on what is known as the "frontside" of the support.

In addition, "frontside" also generally means the side of a thermally developable material that is first exposed to imaging radiation, and "backside" generally means the opposite side of the thermally developable material.

The terms "double-sided" and "double-faced coating" are used to define photothermographic materials having one or more of the same or different thermally developable emulsion layers disposed on both sides (frontside and backside) of the support.

"Photocatalyst" means a photosensitive compound such as silver halide that, upon exposure to radiation, provides a compound that is capable of acting as a catalyst for the subsequent development of the image-forming material.

Many of the materials used herein are provided as a solution. The term "active ingredient" means the amount or the percentage of the desired material contained in a sample. All amounts listed herein are the amount of active ingredient added.

"Ultraviolet region of the spectrum" refers to that region of the spectrum less than or equal to 410 mn, and preferably from about 100 nm to about 410 nm, although parts of these ranges may be visible to the naked human eye. More preferably, the ultraviolet region of the spectrum is the region of from about 190 to about 405 nm.

"Visible region of the spectrum" refers to that region of the spectrum of from about 400 nm to about 700 nm.

"Short wavelength visible region of the spectrum" refers to that region of the spectrum of from about 400 nm to about 450 nm.

"Red region of the spectrum" refers to that region of the spectrum of from about 600 nm to about 700 nm.

"Infrared region of the spectrum" refers to that region of the spectrum of from about 700 nm to about 1400 nm.

"Non-photosensitive" means not intentionally light sensitive.

The sensitometric terms $D_{min}$ and $D_{max}$ have conventional definitions known in the imaging arts. In photothermographic materials, $D_{min}$ is considered herein as image density achieved when the photothermographic material is thermally developed without prior exposure to radiation. It is the average of eight lowest density values on the exposed side of the fiducial mark. In thermographic materials, $D_{min}$ is considered herein as image density in the non-thermally imaged areas of the thermographic material.

The sensitometric term "absorbance" is another term for optical density (OD).

"Transparent" means capable of transmitting visible light or imaging radiation without appreciable scattering or absorption.

As used herein, the phrase "organic silver coordinating ligand" refers to an organic molecule capable of forming a bond with a silver atom. Although the compounds so formed are technically silver coordination compounds they are also often referred to as silver salts.

In the compounds described herein, no particular double bond geometry (for example, cis or trans) is intended by the structures drawn. Similarly, in compounds having alternating single and double bonds and localized charges their structures are drawn as a formalism. In reality, both electron and charge delocalization exists throughout the conjugated chain.

As is well understood in this art, for the chemical compounds herein described, substitution is not only tolerated, but is often advisable and various substituents are anticipated on the compounds used in the present invention unless otherwise stated. Thus, when a compound is referred to as "having the structure" of, or as "a derivative" of, a given formula, any substitution that does not alter the bond structure of the formula or the shown atoms within that structure is included within the formula, unless such substitution is specifically excluded by language (such as "free of carboxy-substituted alkyl"). For example, where a triazine-thione ring structure is shown (including fused ring structures), substituent groups may be placed on the triazine-thione ring structure to form triazine-thione derivatives, but the atoms making up the triazine-thione ring structure may not be replaced.

As a means of simplifying the discussion and recitation of certain substituent groups, the term "group" refers to chemical species that may be substituted as well as those that are not so substituted. Thus, the term "group," such as "alkyl group" is intended to include not only pure hydrocarbon alkyl chains, such as methyl, ethyl, n-propyl, t-butyl, cyclohexyl, iso-octyl, and octadecyl, but also alkyl chains bearing substituents known in the art, such as hydroxyl, alkoxy, phenyl, halogen atoms (F, Cl, Br, and I), cyano, nitro, amino, and carboxy. For example, alkyl group includes ether and thioether groups (for example $CH_3$—$CH_2$—$CH_2$—O—$CH_2$— and $CH_3$—$CH_2$—$CH_2$—S—$CH_2$—), haloalkyl, nitroalkyl, alkylcarboxy, carboxyalkyl, carboxamido, hydroxyalkyl, sulfoalkyl, and other groups readily apparent to one skilled in the art. Substituents that adversely react with other active ingredients, such as very strongly electrophilic or oxidizing substituents, would, of course, be excluded by the ordinarily skilled artisan as not being inert or harmless.

*Research Disclosure* is a publication of Kenneth Mason Publications Ltd., Dudley House, 12 North Street, Emsworth, Hampshire PO10 7DQ England (also available from Emsworth Design Inc., 147 West 24th Street, New York, N.Y. 10011).

Other aspects, advantages, and benefits of the present invention are apparent from the detailed description, examples, and claims provided in this application.

The Photocatalyst

As noted above, the photothermographic materials of the present invention include one or more photocatalysts in the photothermographic emulsion layer(s). Useful photocatalysts are typically silver halides such as silver bromide, silver iodide, silver chloride, silver bromoiodide, silver chlorobromoiodide, silver chlorobromide, and others readily apparent to one skilled in the art. Mixtures of silver halides can also be used in any suitable proportion. In preferred embodiments, the silver halide comprises at least 70 mol % silver bromide with the remainder being silver chloride and silver iodide. More preferably, the amount of silver bromide is at least 90 mol %. Silver bromide and silver bromoiodide are more preferred silver halides, with the latter silver halide having up to 10 mol % silver iodide based on total silver halide. Typical techniques for preparing and precipitating silver halide grains are described in *Research Disclosure,* 1978, item 17643.

In some embodiments of aqueous-based photothermographic materials, higher amounts of iodide may be present in the photosensitive silver halide grains, and particularly from about 20 mol % up to the saturation limit of iodide, to increase image stability and to reduce "print-out," as described for example in copending and commonly assigned U.S. Ser. No. 10/246,265 (filed Sep. 18, 2002 by Maskasky and Scaccia).

The shape of the photosensitive silver halide grains used in the present invention is in no way limited. The silver halide grains may have any crystalline habit including, but not limited to, cubic, octahedral, tetrahedral, orthorhombic, rhombic, dodecahedral, other polyhedral, tabular, laminar, twinned, or platelet morphologies and may have epitaxial growth of crystals thereon. If desired, a mixture of these crystals can be employed. Silver halide grains having cubic and tabular morphology are preferred.

The silver halide grains may have a uniform ratio of halide throughout. They may have a graded halide content, with a continuously varying ratio of, for example, silver bromide and silver iodide or they may be of the core-shell type, having a discrete core of one halide ratio, and a discrete shell of another halide ratio. For example, the central regions of the tabular grains may contain at least 1 mol % more iodide than the outer or annular regions of the grains. Core-shell silver halide grains useful in photothermographic materials and methods of preparing these materials are described for example in U.S. Pat. No. 5,382,504 (Shor et al.), incorporated herein by reference. Iridium and/or copper doped core-shell and non-core-shell grains are described in U.S. Pat. No. 5,434,043 (Zou et al.) and U.S. Pat. No. 5,939,249 (Zou), both incorporated herein by reference. Mixtures of preformed silver halide grains having different compositions or dopants grains may be employed.

The photosensitive silver halide can be added to (or formed within) the emulsion layer(s) in any fashion as long as it is placed in catalytic proximity to the non-photosensitive source of reducible silver ions.

It is preferred that the silver halide grains be preformed and prepared by an ex-situ process. The silver halide grains prepared ex-situ may then be added to and physically mixed with the non-photosensitive source of reducible silver ions.

In some formulations it is useful to form the source of reducible silver ions in the presence of ex-situ-prepared silver halide. In this process, the source of reducible silver ions, such as a long chain fatty acid silver carboxylate (commonly referred to as a silver "soap"), is formed in the presence of the preformed silver halide grains. Co-precipitation of the reducible source of silver ions in the presence of silver halide provides a more intimate mixture of the two materials [see, for example U.S. Pat. No. 3,839,049 (Simons)]. Materials of this type are often referred to as "preformed soaps."

In general, the non-tabular silver halide grains used in the imaging formulations can vary in average diameter of up to several micrometers (μm) depending on their desired use. Usually, the silver halide grains have an average particle size of from about 0.01 to about 1.5 μm. In some embodiments, the average particle size is preferable from about 0.03 to about 1.0 μm, and more preferably from about 0.05 to about 0.8 μm. Those of ordinary skill in the art understand that there is a finite lower practical limit for silver halide grains that is partially dependent upon the wavelengths to which the grains are spectrally sensitized. Such a lower limit, for example, is typically from about 0.01 to about 0.005 μm.

The average size of the photosensitive doped silver halide grains is expressed by the average diameter if the grains are spherical, and by the average of the diameters of equivalent circles for the projected images if the grains are cubic, tabular, or other non-spherical shapes.

Grain size may be determined by any of the methods commonly employed in the art for particle size measurement. Representative methods are described by in "Particle Size Analysis," ASTM Symposium on Light Microscopy, R. P. Loveland, 1955, pp. 94–122, and in C. E. K. Mees and T. H. James, *The Theory of the Photographic Process*, Third Edition, Macmillan, New York, 1966, Chapter 2. Particle size measurements may be expressed in terms of the projected areas of grains or approximations of their diameters. These will provide reasonably accurate results if the grains of interest are substantially uniform in shape.

In most preferred embodiments of this invention, the silver halide grains are tabular silver halide grains that are considered "ultrathin" and have an average thickness of at least 0.02 μm and up to and including 0.10 μm. Preferably, these ultrathin grains have an average thickness of at least 0.03 μm and more preferably of at least 0.04 μm, and up to and including 0.08 μm and more preferably up to and including 0.07 μm.

In addition, these ultrathin tabular grains have an equivalent circular diameter (ECD) of at least 0.5 μm, preferably at least 0.75 μm, and more preferably at least 1 μm. The ECD can be up to and including 8 μm, preferably up to and including 6 μm, and more preferably up to and including 4 μm.

The aspect ratio of the useful tabular grains is at least 5:1, preferably at least 10:1, and more preferably at least 15:1. For practical purposes, the tabular grain aspect is generally up to 50:1.

The grain size of ultrathin tabular grains may be determined by any of the methods commonly employed in the art for particle size measurement, such as those described above.

The ultrathin tabular silver halide grains can also be doped using one or more of the conventional metal dopants known for this purpose including those described in *Research Disclosure* item 38957, September, 1996 and U.S. Pat. No. 5,503,970 (Olm et al.), incorporated herein by reference. Preferred dopants include iridium (III or IV) and ruthenium (II or III) salts.

Preformed silver halide emulsions used in the material of this invention can be prepared by aqueous or organic processes and can be unwashed or washed to remove soluble salts. In the latter case, the soluble salts can be removed by ultrafiltration, by chill setting and leaching, or by washing the coagulum [for example, by the procedures described in U.S. Pat. No. 2,618,556 (Hewitson et al.), U.S. Pat. No. 2,614,928 (Yutzy et al.), U.S. Pat. No. 2,565,418 (Yackel), U.S. Pat. No. 3,241,969 (Hart et al.), and U.S. Pat. No. 2,489,341 (Waller et al.)].

It is also effective to use an in-situ process in which a halide-containing compound is added to an organic silver salt to partially convert the silver of the organic silver salt to silver halide. The halogen-containing compound can be inorganic (such as zinc bromide or lithium bromide) or organic (such as N-bromosuccinimide).

Additional methods of preparing these silver halide and organic silver salts and manners of blending them are described in *Research Disclosure*, June 1978, item 17029, U.S. Pat. No. 3,700,458 (Lindholm) and U.S. Pat. No. 4,076,539 (Ikenoue et al.), JP Kokai 49-013224, (Fuji), JP Kokai 50-017216 (Fuji), and JP Kokai 51-042529 (Fuji).

Mixtures of both in-situ and ex-situ silver halide grains may be used.

In some instances, it may be helpful to prepare the photosensitive silver halide grains in the presence of a hydroxytetraazaindene (such as 4-hydroxy-6-methyl-1,3,3a,7-tetraazaindene) or an N-heterocyclic compound comprising at least one mercapto group (such as 1-phenyl-5-mercaptotetrazole) to provide increased photospeed. Details of this procedure are provided in U.S. Pat. No. 6,413,710 (Shor et al.), that is incorporated herein by reference.

The one or more light-sensitive silver halides used in the photothermographic materials of the present invention are preferably present in an amount of from about 0.005 to about 0.5 mole, more preferably from about 0.01 to about 0.25 mole, and most preferably from about 0.03 to about 0.15 mole, per mole of non-photosensitive source of reducible silver ions.

Chemical Sensitizers

The photosensitive silver halides used in photothermographic features of the invention may be employed without modification. However, one or more conventional chemical sensitizers may be used in the preparation of the photosensitive silver halides to increase photospeed. Such compounds may contain sulfur, tellurium, or selenium, or may comprise a compound containing gold, platinum, palladium, ruthenium, rhodium, iridium, or combinations thereof, a reducing agent such as a tin halide or a combination of any of these. The details of these materials are provided for example, in T. H. James, *The Theory of the Photographic Process*, Fourth Edition, Eastman Kodak Company, Rochester, N.Y., 1977, Chapter 5, pp. 149–169. Suitable conventional chemical sensitization procedures are also described in U.S. Pat. No. 1,623,499 (Sheppard et al.), U.S. Pat. No. 2,399,083 (Waller et al.), U.S. Pat. No. 3,297,447

(McVeigh), U.S. Pat. No. 3,297,446 (Dunn), U.S. Pat. No. 5,049,485 (Deaton), U.S. Pat. No. 5,252,455 (Deaton), U.S. Pat. No. 5,391,727 (Deaton), U.S. Pat. No. 5,912,111 (Lok et al.), U.S. Pat. No. 5,759,761 (Lushington et al.), U.S. Pat. No. 6,296,998 (Eikenberry et al), and EP 0 915 371 A1 (Lok et al.).

In addition, mercaptotetrazoles and tetraazaindenes as described in U.S. Pat. No. 5,691,127 (Daubendiek et al.), incorporated herein by reference, can be used as suitable addenda for tabular silver halide grains.

When used, sulfur sensitization is usually performed by adding a sulfur sensitizer and stirring the emulsion at an appropriate temperature for a predetermined time. Various sulfur compounds can be used. Some examples of sulfur sensitizers include thiosulfates, thioureas, thioamides, thiazoles, rhodanines, phosphine sulfides, thiohydantoins, 4-oxo-oxazolidine-2-thiones, dipolysulfides, mercapto compounds, polythionates, and elemental sulfur.

Certain tetrasubstituted thiourea compounds are also useful in the present invention. Such compounds are described, for example in U.S. Pat. No. 6,296,998 (Eikenberry et al.), U.S. Pat. No. 6,322,961 (Lam et al.) and U.S. Pat. No. 6,368,779 (Lynch et al.). Also useful are the tetrasubstituted middle chalcogen (that is, sulfur, selenium, and tellurium) thiourea compounds disclosed in U.S. Pat. No. 4,810,626 (Burgmaier et al.). All of the above publications are incorporated herein by reference.

The amount of the sulfur sensitizer to be added varies depending upon various conditions such as pH, temperature and grain size of silver halide at the time of chemical ripening, it is preferably from $10^{-7}$ to $10^{-2}$ mole per mole of silver halide, and more preferably from $10^{-6}$ to $10^{-4}$ mole per mold of silver halide.

In one embodiment, chemical sensitization is achieved by oxidative decomposition of a sulfur-containing spectral sensitizing dye in the presence of a photothermographic emulsion. Such sensitization is described in U.S. Pat. No. 5,891,615 (Winslow et al.), incorporated herein by reference.

Still other useful chemical sensitizers include certain selenium-containing compounds. When used, selenium sensitization is usually performed by adding a selenium sensitizer and stirring the emulsion at an appropriate temperature for a predetermined time. Some specific examples of useful selenium compounds can be found in U.S. Pat. No. 5,158,892 (Sasaki et al.), U.S. Pat. No. 5,238,807 (Sasaki et al.), U.S. Pat. No. 5,942,384 (Arai et al.) and in co-pending and commonly assigned U.S. Ser. No. 10/082,516 (filed Feb. 25, 2002 by Lynch, Opatz, Gysling, and Simpson). All of the above documents are incorporated herein by reference.

Still other useful chemical sensitizers include certain tellurium-containing compounds. When used, tellurium sensitization is usually performed by adding a tellurium sensitizer and stirring the emulsion at an appropriate temperature for a predetermined time. Tellurium compounds for use as chemical sensitizers can be selected from those described in *J. Chem. Soc., Chem. Commun.* 1980, 635, ibid., 1979, 1102, ibid., 1979, 645, *J. Chem. Soc. Perkin. Trans,* 1980, 1, 2191, *The Chemistry of Organic Selenium and Tellurium Compounds*, S. Patai and Z. Rappoport, Eds., Vol. 1 (1986), and Vol. 2 (1987), U.S. Pat. No. 1,623,499 (Sheppard et al.), U.S. Pat. No. 3,320,069 (Illingsworth), U.S. Pat. No. 3,772,031 (Berry et al.), U.S. Pat. No. 5,215,880 (Kojima et al.), U.S. Pat. No. 5,273,874 (Kojima et al.), U.S. Pat. No. 5,342,750 (Sasaki et al.), U.S. Patent 5,677,120 (Lushington et al.), British Patent 235,211 (Sheppard), British Patent 1,121,496 (Halwig), British Patent 1,295,462 (Hilson et al.) British Patent 1,396,696 (Simons), JP Kokai 04-271341 A (Morio et al.), in co-pending and commonly assigned U.S. Ser. No. 09/975,909 (filed Oct. 11, 2001 by Lynch, Opatz, Shor, Simpson, Willett, and Gysling), and in co-pending and commonly assigned U.S. Ser. No. 09/923,039 (filed Aug. 6, 2001 by Gysling, Dickinson, Lelental, and Boettcher). All of the above documents are incorporated herein by reference.

The amount of the selenium or tellurium sensitizer used in the present invention varies depending on silver halide grains used or chemical ripening conditions. However, it is generally from $10^{-8}$ to $10^{-2}$ mole per mole of silver halide, preferably on the order of from $10^{-7}$ to $10^{-3}$ mole of silver halide.

Noble metal sensitizers for use in the present invention include gold, platinum, palladium and iridium. Gold sensitization is particularly preferred.

When used, the gold sensitizer used for the gold sensitization of the silver halide emulsion used in the present invention may have an oxidation number of 1 or 3, and may be a gold compound commonly used as a gold sensitizer. U.S. Pat. No. 5,858,637 (Eshelman et al.) describes various Au (I) compounds that can be used as chemical sensitizers. Other useful gold compounds can be found in U.S. Pat. No. 5,759,761 (Lushington et al.). Useful combinations of gold (I) complexes and rapid sulfiding agents are described in U.S. Pat. No. 6,322,961 (Lam et al.). Combinations of gold (III) compounds and either sulfur- or tellurium-containing compounds are useful as chemical sensitizers and are described in U.S. Pat. No. 6,423,481 (Simpson et al.). All of the above references are incorporated herein by reference.

Reduction sensitization may also be used. Specific examples of compounds useful in reduction sensitization include, but are not limited to, stannous chloride, hydrazine ethanolamine, and thioureaoxide. Reduction sensitization may be performed by ripening the grains while keeping the emulsion at pH 7 or above, or at pAg 8.3 or less.

The chemical sensitizers can be used in making the silver halide emulsions in conventional amounts that generally depend upon the average size of the silver halide grains. Generally, the total amount is at least $10^{-10}$ mole per mole of total silver, and preferably from about $10^{-8}$ to about $10^{-2}$ mole per mole of total silver. The upper limit can vary depending upon the compound(s) used, the level of silver halide, and the average grain size and grain morphology, and would be readily determinable by one of ordinary skill in the art.

Spectral Sensitizers

The photosensitive silver halides used in the photothermographic features of the invention may be spectrally sensitized with various spectral sensitizing dyes that are known to enhance silver halide sensitivity to ultraviolet, visible, and/or infrared radiation. Non-limiting examples of sensitizing dyes that can be employed include cyanine dyes, merocyanine dyes, complex cyanine dyes, complex merocyanine dyes, holopolar cyanine dyes, hemicyanine dyes, styryl dyes, and hemioxanol dyes. Cyanine dyes, merocyanine dyes and complex merocyanine dyes are particularly useful. Spectral sensitizing dyes are chosen for optimum photosensitivity, stability, and synthetic ease. They may be added at any stage in chemical finishing of the photothermographic emulsion.

Suitable sensitizing dyes such as those described in U.S. Pat. No. 3,719,495 (Lea), U.S. Pat. No. 4,396,712 (Kinoshita et al.), U.S. Pat. No. 4,439,520 (Kofron et al.), U.S. Pat. No. 4,690,883 (Kubodera et al.), U.S. Pat. No. 4,840,882 (Iwagaki et al.), U.S. Pat. No. 5,064,753 (Kohno et al.), U.S. Pat. No. 5,281,515 (Delprato et al.), U.S. Pat. No. 5,393,654 (Burrows et al), U.S. Pat. No. 5,441,866

(Miller et al.), U.S. Pat. No. 5,508,162 (Dankosh), U.S. Pat. No. 5,510,236 (Dankosh), U.S. Pat. No. 5,541,054 (Miller et al.), JP Kokai 2000-063690 (Tanaka et al.), JP Kokai 2000-112054 (Fukusaka et al.), JP Kokai 2000-273329 (Tanaka et al.), JP Kokai 2001-005145 (Arai), JP Kokai 2001-064527 (Oshiyama et al.), and JP Kokai 2001-154305 (Kita et al.), can be used in the practice of the invention. All of the publications noted above are incorporated herein by reference. A summary of generally useful spectral sensitizing dyes is contained in *Research Disclosure*, item 308119, Section IV, December, 1989. Additional classes of dyes useful for spectral sensitization, including sensitization at other wavelengths are described in *Research Disclosure,* 1994, item 36544, section V.

Teachings relating to specific combinations of spectral sensitizing dyes also include U.S. Pat. No. 4,581,329 (Sugimoto et al.), U.S. Pat. No. 4,582,786 (Ikeda et al.), U.S. Pat. No. , U.S. Pat. No. 4,609,621 (Sugimoto et al.), U.S. Pat. No. 4,675,279 (Shuto et al.), U.S. Pat. No. 4,678,741 (Yamada et al.), U.S. Pat. No. 4,720,451 (Shuto et al.), U.S. Pat. No. 4,818,675 (Miyasaka et al.), U.S. Pat. No. 4,945,036 (Arai et al.), and U.S. Pat. No. 4,952,491 (Nishikawa et al.). All of the above publications and patents are incorporated herein by reference.

Specific examples of useful spectral sensitizing dyes for the photothermographic materials of this invention include, for example, 2-[[5-chloro-3-(3-sulfopropyl)-2(3H)-benzothiazolylidene]methyl]-1-(3-sulfopropyl)-naphtho[1,2-d]thiazolium, inner salt, N,N-diethylethanamine salt (1:1), 2-[[5,6-dichloro-1-ethyl-1,3-dihydro-3-(3-sulfopropyl)-2H-benzimidazol-2-ylidene]methly]-5-phenyl-3-(3-sulfopropyl)-benzoxazolium, inner salt, potassium salt, 5-chloro-2-[[5-chloro-3-(3-sulfopropyl)-2(3H)-benzothiazolylidene]methyl]-3-(3-sulfopropyl)-benzothiazolium, inner salt, N,N-diethylethanamine salt (1:1), and 5-phenyl-2-((5-phenyl-3-(3-sulfopropyl)-2(3H)-benzoxazolylidene) methyl)-3-(3-sulfopropyl)-benzothiazolium, inner salt, N,N-diethylethanamine salt(1:1).

Also useful are spectral sensitizing dyes that decolorize by the action of light or heat. Such dyes are described in U.S. Pat. No. 4,524,128 (Edwards et al.), JP Kokai 2001-109101 (Adachi), JP Kokai 2001-154305 (Kita et al.), and JP 2001-183770 (Hanyu et al.).

Spectral sensitizing dyes may be used singly or in combination. The dyes are selected for the purpose of adjusting the wavelength distribution of the spectral sensitivity, and for the purpose of supersensitization. When using a combination of dyes having a supersensitizing effect, it is possible to attain much higher sensitivity than the sum of sensitivities that can be achieved by using each dye alone. It is also possible to attain such supersensitizing action by the use of a dye having no spectral sensitizing action by itself, or a compound that does not substantially absorb visible light. Diaminostilbene compounds are often used as supersensitizers.

An appropriate amount of spectral sensitizing dye added is generally about $10^{-10}$ to $10^{-1}$ mole, and preferably, about $10^{-7}$ to $10^{-2}$ mole per mole of silver halide.

Non-Photosensitive Source of Reducible Silver Ions

The non-photosensitive source of reducible silver ions used in photothermographic materials of this invention can be any organic compound that contains reducible silver (1+) ions. Preferably, it is an organic silver salt that is comparatively stable to light and forms a silver image when heated to 50° C. or higher in the presence of an exposed photocatalyst (such as silver halide) and a reducing composition.

Silver salts of nitrogen-containing heterocyclic compounds are preferred, and one or more silver salts of compounds containing an imino group are particularly preferred in the aqueous-based photothermographic formulations used in the practice of this invention. Preferred examples of these compounds include, but are not limited to, silver salts of benzotriazole and substituted derivatives thereof (for example, silver methylbenzotriazole and silver 5-chloro-benzotriazole), silver salts of 1,2,4-triazoles or 1-H-tetrazoles such as phenyl-mercaptotetrazole as described in U.S. Pat. No. 4,220,709 (deMauriac), and silver salts of imidazoles and imidazole derivatives as described in U.S. Pat. No. 4,260,677 (Winslow et al.). Particularly preferred are the silver salts of benzo-triazole and substituted derivatives thereof. A silver salt of benzotriazole is most preferred.

Silver salts of compounds containing mercapto or thione groups and derivatives thereof can also be used. Preferred compounds of this type include a heterocyclic nucleus containing 5 or 6 atoms in the ring, at least one of which is a nitrogen atom, and other atoms being carbon, oxygen, or sulfur atoms. Such heterocyclic nuclei include, but are not limited to, triazoles, oxazoles, thiazoles, thiazolines, imidazoles, diazoles, pyridines, and triazines. Representative examples of these silver salts include, but are not limited to, a silver salt of 3-mercapto-4-phenyl-1,2,4-triazole, a silver salt of 2-mercaptobenzimidazole, a silver salt of 2-mercapto-5-aminothiadiazole, a silver salt of 2-(2-ethylglycol-amido)benzothiazole, silver salts of thioglycolic acids (such as a silver salt of a S-alkylthioglycolic acid, wherein the alkyl group has from 12 to 22 carbon atoms), silver salts of dithiocarboxylic acids (such as a silver salt of dithioacetic acid), a silver salt of thioamide, a silver salt of 5-carboxylic-1-methyl-2-phenyl-4-thio-pyridine, a silver salt of mercaptotriazine, a silver salt of 2-mercaptobenzoxazole, silver salts as described in U.S. Pat. No. 4,123,274 (Knight et al.) (for example, a silver salt of a 1,2,4-mercaptotriazole derivative, such as a silver salt of 3-amino-5-benzylthio-1,2,4-triazole), and a silver salt of thione compounds [such as a silver salt of 3-(2-carboxyethyl)-4-methyl-4-thiazoline-2-thione as described in U.S. Pat. No. 3,785,830 (Sullivan et al.).

Silver salts of organic acids including silver salts of long-chain carboxylic acids can also be used. Examples thereof include a silver salt of an aliphatic carboxylic acid (for example having 10 to 30, and preferably 15 to 28, carbon atoms in the fatty acid). Examples thereof include a silver salt of an aliphatic carboxylic acid or a silver salt of an aromatic carboxylic acid. Preferred examples of the silver salts of aliphatic carboxylic acids include silver behenate, silver arachidate, silver stearate, silver oleate, silver laurate, silver caprate, silver myristate, silver palmitate, silver maleate, silver fumarate, silver tartarate, silver furoate, silver linoleate, silver butyrate, silver camphorate, and mixtures thereof. Preferably, at least silver behenate is used alone or in mixtures with other silver salts.

Representative examples of silver salts of aromatic carboxylic acid and other carboxylic acid group-containing compounds include, but are not limited to, silver benzoate, silver substituted-benzoates (such as silver 3,5-dihydroxybenzoate, silver o-methylbenzoate, silver m-methylbenzoate, silver p-methyl-benzoate, silver 2,4-dichlorobenzoate, silver acetamidobenzoate, silver p-phenyl-benzoate), silver tannate, silver phthalate, silver terephthalate, silver salicylate, silver phenylacetate, and silver pyromellitate.

Silver salts of aliphatic carboxylic acids containing a thioether group as described in U.S. Pat. No. 3,330,663 (Weyde et al.) are also useful. Soluble silver carboxylates comprising hydrocarbon chains incorporating ether or thioether linkages, or sterically hindered substitution in the α-(on a hydrocarbon group) or ortho- (on an aromatic group) position, and displaying increased solubility in coating solvents and affording coatings with less light scattering can also be used. Such silver carboxylates are described in U.S. Pat. No. 5,491,059 (Whitcomb). Mixtures of any of the silver salts described herein can also be used if desired.

Silver salts of dicarboxylic acids are also useful. Such acids may be aliphatic, aromatic, or heterocyclic. Examples of such acids include, for example, phthalic acid, glutamic acid, or homo-phthalic acid.

In some embodiments of this invention, a mixture of a silver salt of a compound having an imino group and a silver carboxylate can be used.

Silver salts of sulfonates are also useful in the practice of this invention. Such materials are described for example in U.S. Pat. No. 4,504,575 (Lee). Silver salts of sulfosuccinates are also useful as described for example in EP 0 227 141A1 (Leenders et al.).

Moreover, silver salts of acetylenes can also be used as described, for example in U.S. Pat. No. 4,761,361 (Ozaki et al.) and U.S. Pat. No. 4,775,613 (Hirai et al.).

The methods used for making silver soap emulsions are well known in the art and are disclosed in *Research Disclosure*, April 1983, item 22812, *Research Disclosure*, October 1983, item 23419, U.S. Pat. No. 3,985,565 (Gabrielson et al.) and the references cited above.

Non-photosensitive sources of reducible silver ions can also be provided as core-shell silver salts such as those described in U.S. Pat. No. 6,355,408 (Whitcomb et al.), that is incorporated herein by reference. These silver salts include a core comprised of one or more silver salts and a shell having one or more different silver salts.

Still another useful source of non-photosensitive reducible silver ions in the practice of this invention are the silver dimer compounds that comprise two different silver salts as described in U.S. Pat. No. 6,172,131 (Whitcomb), that is incorporated herein by reference. Such non-photosensitive silver dimer compounds comprise two different silver salts, provided that when the two different silver salts comprise straight-chain, saturated hydrocarbon groups as the silver coordinating ligands, those ligands differ by at least 6 carbon atoms.

As one skilled in the art would understand, the non-photosensitive source of reducible silver ions can include various mixtures of the various silver salt compounds described herein, in any desirable proportions.

The photocatalyst and the non-photosensitive source of reducible silver ions must be in catalytic proximity (that is, reactive association). It is preferred that these reactive components be present in the same emulsion layer.

The one or more non-photosensitive sources of reducible silver ions are preferably present in an amount of about 5% by weight to about 70% by weight, and more preferably, about 10% to about 50% by weight, based on the total dry weight of the emulsion layers. Stated another way, the amount of the sources of reducible silver ions is generally present in an amount of from about 0.001 to about 0.2 mol/$m^2$ of the dry photothermographic material, and preferably from about 0.01 to about 0.05 mol/$m^2$ of that material.

The total amount of silver (from all silver sources) in the photothermographic materials is generally at least 0.002 mol/$m^2$ and preferably from about 0.01 to about 0.05 mol/$m^2$.

Reducing Agents

When used in a thermographic or photothermographic material, the reducing agent (or reducing agent composition comprising two or more components) for the source of reducible silver ions can be any material, preferably an organic material, that can reduce silver (I) ion to metallic silver.

Conventional photographic developers can be used as reducing agents, including aromatic di- and tri-hydroxy compounds (such as hydroquinones, gallic acid and gallic acid derivatives, catechols, and pyrogallols), aminophenols (for example, N-methylaminophenol), sulfonamidophenols, p-phenylenediamines, alkoxynaphthols (for example, 4-methoxy-1-naphthol), pyrazolidin-3-one type reducing agents (for example PHENIDONE®), pyrazolin-5-ones, polyhydroxy spiro-bis-indanes, indan-1,3-dione derivatives, hydroxytetrone acids, hydroxytetronimides, hydroxylamine derivatives such as for example those described in U.S. Pat. No. 4,082,901 (Laridon et al.), hydrazine derivatives, hindered phenols, amidoximes, azines, reductones (for example, ascorbic acid and ascorbic acid derivatives), leuco dyes, and other materials readily apparent to one skilled in the art.

When a silver salt of a compound containing an imino group (such as, for example, a silver benzotriazole) is used as the source of reducible silver ions, ascorbic acid reducing agents are preferred. An "ascorbic acid" reducing agent (also referred to as a developer or developing agent) means ascorbic acid, complexes thereof, and derivatives thereof. Ascorbic acid developing agents are described in a considerable number of publications in photographic processes, including U.S. Pat. No. 5,236,816 (Purol et al.) and references cited therein.

Useful ascorbic acid developing agents include ascorbic acid and the analogues, isomers, complexes, and derivatives thereof. Such compounds include, but are not limited to, D- or L-ascorbic acid, 2,3-dihydroxy-2-cyclohexen-1-one, 3,4-dihydroxy-5-phenyl-2(5H)-furanone, sugar-type derivatives thereof (such as sorboascorbic acid, γ-lactoascorbic acid, 6-desoxy-L-ascorbic acid, L-rhamnoascorbic acid, imino-6-desoxy-L-ascorbic acid, glucoascorbic acid, fucoascorbic acid, glucoheptoascorbic acid, maltoascorbic acid, L-arabosascorbic acid), sodium ascorbate, niacinamide ascorbate, potassium ascorbate, isoascorbic acid (or L-erythroascorbic acid), and salts thereof (such as alkali metal, ammonium or others known in the art), endiol type ascorbic acid, an enaminol type ascorbic acid, a thioenol type ascorbic acid, and an enamin-thiol type ascorbic acid, as described for example in U.S. Pat. No. 5,498,511 (Yamashita et al.), EP 0 585 792 A1 (Passarella et al.), EP -0 573 700 A1 (Lingier et al.), EP 0 588 408 A1 (Hieronymus et al.), U.S. Pat. No. 5,089,819 (Knapp), U.S. Pat. No. 5,278,035 (Knapp), U.S. Pat. No. 5,384,232 (Bishop et al.), U.S. Pat. No. 5,376,510 (Parker et al.), JP Kokai 7-56286 (Toyoda), U.S. Pat. No. 2,688,549 (James et al.), and *Research Disclosure*, publication 37152, March 1995. D-, L-, or D,L-ascorbic acid (and alkali metal salts thereof) or isoascorbic acid (or alkali metal salts thereof) are preferred. Sodium ascorbate and sodium isoascorbate are most preferred. Mixtures of these developing agents can be used if desired.

When a silver carboxylate silver source is used in a photothermographic material, hindered phenol reducing agents are preferred. In some instances, the reducing agent composition comprises two or more components such as a hindered phenol developer and a co-developer that can be chosen from the various classes of co-developers and reducing agents described below. Ternary developer mixtures involving the further addition of contrast enhancing agents are also useful. Such contrast enhancing agents can be chosen from the various classes of reducing agents described below.

"Hindered phenol reducing agents" are compounds that contain only one hydroxy group on a given phenyl ring and have at least one additional substituent located ortho to the hydroxy group. Hindered phenol reducing agents may contain more than one hydroxy group as long as each hydroxy group is located on different phenyl rings. Hindered phenol reducing agents include, for example, binaphthols (that is dihydroxybinaphthyls), biphenols (that is dihydroxybiphenyls), bis(hydroxynaphthyl)methanes, bis(hydroxyphenyl)methanes (that is bisphenols), hindered phenols, and hindered naphthols, each of which may be variously substituted.

Representative binaphthols include, but are not limited, to 1,1'-bi-2-naphthol, 1,1'-bi-4-methyl-2-naphthol and 6,6'-dibromo-bi-2-naphthol. For additional compounds see U.S. Pat. No. 3,094,417 (Workman) and U.S. Pat. No. 5,262,295 (Tanaka et al.), both incorporated herein by reference.

Representative biphenols include, but are not limited, to 2,2'-dihydroxy-3,3'-di-t-butyl-5,5-dimethylbiphenyl, 2,2'-dihydroxy-3,3',5,5'-tetra-t-butylbiphenyl, 2,2'-dihydroxy-3,3'-di-t-butyl-5,5'-dichloro-biphenyl, 2-(2-hydroxy-3-t-butyl-5-methylphenyl)-4-methyl-6-n-hexylphenol, 4,4'-dihydroxy-3,3',5,5'-tetra-t-butylbiphenyl and 4,4'-dihydroxy-3,3',5,5'-tetra-methylbiphenyl. For additional compounds see U.S. Pat. No. 5,262,295 (noted above).

Representative bis(hydroxynaphthyl)methanes include, but are not limited to, 4,4'-methylenebis(2-methyl-1-naphthol). For additional compounds see U.S. Pat. No. 5,262,295 (noted above).

Representative bis(hydroxyphenyl)methanes include, but are not limited to, bis(2-hydroxy-3-t-butyl-5-methylphenyl)methane (CAO-5), 1,1 '-bis(2-hydroxy-3,5-dimethylphenyl)-3,5,5-trimethylhexane (NONOX® or PERMANAX WSO), 1,1'-bis(3,5-di-t-butyl-4-hydroxyphenyl)methane, 2,2'-bis(4-hydroxy-3-methylphenyl)propane, 4,4'-ethylidene-bis(2-t-butyl-6-methylphenol), 2,2 '-isobutylidene-bis(4,6-dimethylphenol) (LOWINOX® 221B46), and 2,2'-bis(3,5-dimethyl-4-hydroxyphenyl)propane. For additional compounds see U.S. Pat. No. 5,262,295 (noted above).

Representative hindered phenols include, but are not limited to, 2,6-di-t-butylphenol, 2,6-di-t-butyl-4-methylphenol, 2,4-di-t-butylphenol, 2,6-dichlorophenol, 2,6-dimethylphenol and 2-t-butyl-6-methylphenol.

Representative hindered naphthols include, but are not limited to, 1-naphthol, 4-methyl-1-naphthol, 4-methoxy-1-naphthol, 4-chloro-1-naphthol and 2-methyl-1-naphthol. For additional compounds see U.S. Pat. No. 5,262,295 (noted above).

Mixtures of hindered phenol reducing agents can be used if desired.

More specific alternative reducing agents that have been disclosed in dry silver systems including amidoximes such as phenylamidoxime, 2-thienyl-amidoxime and p-phenoxyphenylamidoxime, azines (for example, 4-hydroxy-3,5-dimethoxybenzaldehydrazine), a combination of aliphatic carboxylic acid aryl hydrazides and ascorbic acid [such as 2,2'-bis(hydroxymethyl)-propionyl-β-phenyl hydrazide in combination with ascorbic acid], a combination of polyhydroxy-benzene and hydroxylamine, a reductone and/or a hydrazine [for example, a combination of hydroquinone and bis(ethoxyethyl)hydroxylamine], piperidinohexose reductone or formyl-4-methylphenylhydrazine, hydroxamic acids (such as phenylhydroxamic acid, p-hydroxyphenylhydroxamic acid, and o-alanine-hydroxamic acid), a combination of azines and sulfonamidophenols (for example, phenothiazine and 2,6-dichloro-4-benzenesulfonamidophenol), α-cyanophenylacetic acid derivatives (such as ethyl α-cyano-2-methylpbenylacetate and ethyl α-cyanophenylacetate), bis-o-naphthols [such as 2,2'-dihydroxyl-1-binaphthyl, 6,6'-dibromo-2,2'-dihydroxy-1,1 '-binaphthyl, and bis(2-hydroxy-1-naphthyl)-methane], a combination of bis-o-naphthol and a 1,3-dihydroxybenzene derivative (for example, 2,4-dihydroxybenzophenone or 2,4-dihydroxyacetophenone), 5-pyrazolones such as 3-methyl-1-phenyl-5-pyrazolone, reductones (such as dimethylaminohexose reductone, anhydrodihydro-aminohexose reductone and anhydrodihydro-piperidone-hexose reductone), sulfonamidophenol reducing agents (such as 2,6-dichloro-4-benzenesulfonamido-phenol, and p-benzenesulfonamidophenol), indane-1,3-diones (such as 2-phenylindane-1,3-dione), chromans (such as 2,2-dimethyl-7-t-butyl-6-hydroxychroman), 1,4-dihydropyridines (such as 2,6-dimethoxy-3,5-dicarbethoxy-1,4-dihydropyridine), ascorbic acid derivatives (such as 1-ascorbylpalmitate, ascorbylstearate and unsaturated aldehydes and ketones), 3-pyrazolidones, and certain indane-1,3-diones.

An additional class of reducing agents that can be used as developers are substituted hydrazines including the sulfonyl hydrazides described in U.S. Pat. No. 5,464,738 (Lynch et al.). Still other useful reducing agents are described, for example, in U.S. Pat. No. 3,074,809 (Owen), U.S. Pat. No. 3,094,417 (Workman), U.S. Pat. No. 3,080,254 (Grant, Jr.), and U.S. Pat. No. 3,887,417 (Klein et al.). Auxiliary reducing agents may be useful as described in U.S. Pat. No. 5,981,151 (Leenders et al.). All of these patents are incorporated herein by reference.

Useful co-developer reducing agents can also be used as described for example, in U.S. Pat. No. 6,387,605 (Lynch et al.), that is incorporated herein by reference. Examples of these compounds include, but are not limited to, 2,5-dioxo-cyclopentane carboxaldehydes, 5-(hydroxymethylene)-2,2-dimethyl-1,3-dioxane-4,6-diones, 5-(hydroxymethylene)-1,3-dialkylbarbituric acids, and 2-(ethoxymethylene)-1H-indene-1,3(2H)-diones.

Additional classes of reducing agents that can be used as co-developers are trityl hydrazides and formyl phenyl hydrazides as described in U.S. Pat. No. 5,496,695 (Simpson et al.), 2-substituted malondialdehyde compounds as described in U.S. Pat. No. 5,654,130 (Murray), and 4-substituted isoxazole compounds as described in U.S. Pat. No. 5,705,324 (Murray). Additional developers are described in U.S. Pat. No. 6,100,022 (Inoue et al.). All of the patents above are incorporated herein by reference.

Yet another class of co-developers includes substituted acrylonitrile compounds that are described in U.S. Pat. No. 5,635,339 (Murray) and U.S. Pat. No. 5,545,515 (Murray et al.), both incorporated herein by reference. Examples of such compounds include, but are not limited to, the compounds identified as HET-01 and HET-02 in U.S. Pat. No. 5,635,339 (noted above) and CN-01 through CN-13 in U.S. Pat. No. 5,545,515 (noted above). Particularly useful compounds of this type are (hydroxymethylene)cyanoacetates and their metal salts.

Various contrast enhancing agents can be used in some photothermographic materials with specific co-developers. Examples of useful contrast enhancing agents include, but are not limited to, hydroxylamines (including hydroxylamine and alkyl- and aryl-substituted derivatives thereof), alkanolamines and ammonium phthalamate compounds as described for example, in U.S. Pat. No. 5,545,505 (Simpson), hydroxamic acid compounds as described for example, in U.S. Pat. No. 5,545,507 (Simpson et al.), N-acylhydrazine compounds as described for example, in U.S. Pat. No. 5,558,983 (Simpson et al.), and hydrogen atom donor compounds as described in U.S. Pat. No. 5,637,449 (Harring et al.). All of the patents above are incorporated herein by reference.

When used with a silver carboxylate silver source in a thermographic material, preferred reducing agents are aromatic di- and tri-hydroxy compounds having at least two hydroxy groups in ortho- or para-relationship on the same aromatic nucleus. Examples are hydroquinone and substituted hydroquinones, catechols, pyrogallol, gallic acid and its esters (for example, methyl gallate, ethyl gallate, propyl gallate), and tannic acid.

Particularly preferred are reducing catechol-type reducing agents having no more than two hydroxy groups in an ortho-relationship. Preferred catechol-type reducing agents include, for example, catechol, 3-(3,4-dihydroxy-phenyl)-propionic acid, 2,3-dihydroxy-benzoic acid, 2,3-dihydroxy-benzoic acid esters, 3,4-dihydroxy-benzoic acid, and 3,4-dihydroxy-benzoic acid esters.

One particularly preferred class of catechol-type reducing agents are benzene compounds in which the benzene nucleus is substituted by no more than two hydroxy groups which are present in 2,3-position on the nucleus and have in the 1-position of the nucleus a substituent linked to the nucleus by means of a carbonyl group. Compounds of this type include 2,3-dihydroxy-benzoic acid, methyl 2,3-dihydroxy-benzoate, and ethyl 2,3-dihydroxy-benzoate.

Another particularly preferred class of catechol-type reducing agents are benzene compounds in which the benzene nucleus is substituted by no more than two hydroxy groups that are present in 3,4-position on the nucleus and have in the 1-position of the nucleus a substituent linked to the nucleus by means of a carbonyl group. Compounds of this type include, for example, 3,4-dihydroxy-benzoic acid, methyl 3,4-dihydroxy-benzoate, ethyl 3,4-dihydroxy-benzoate, 3,4-dihydroxy-benzaldehyde, and phenyl-(3,4-dihydroxyphenyl)ketone. Such compounds are described, for example, in U.S. Pat. No. 5,582,953 (Uyttendaele et al.).

Still another particularly useful class of reducing agents are polyhydroxy spiro-bis-indane compounds described as photographic tanning agents in U.S. Pat. No. 3,440,049 (Moede). Examples include 3,3,3',3'-tetramethyl-5,6,5',6'-tetrahydroxy-1,1'-spiro-bis-indane (called indane I) and 3,3,3',3'-tetramethyl-4,6,7,4',6',7'-hexahydroxy-1,1'-spiro-bis-indane (called indane II).

Aromatic di- and tri-hydroxy reducing agents can also be used in combination with hindered phenol reducing agents either together or in or in combination with one or more high contrast co-developing agents and co-developer contrast-enhancing agents).

The reducing agent (or mixture thereof) described herein is generally present as 1 to 10% (dry weight) of the emulsion layer. In multilayer constructions, if the reducing agent is added to a layer other than an emulsion layer, slightly higher proportions, of from about 2 to 15 weight % may be more desirable. Any co-developers may be present generally in an amount of from about 0.001% to about 1.5% (dry weight) of the emulsion layer coating.

Phosphors

In some embodiments, phosphors can be added to the imaging layers containing the photosensitive silver halide to increase photographic speed as described for example in U.S. Pat. No. 6,440,649 (Simpson et al.), incorporated herein by reference.

Phosphors are materials that emit infrared, visible, or ultraviolet radiation upon excitation. An intrinsic phosphor is a material that is naturally (that is, intrinsically) phosphorescent. An "activated" phosphor is one composed of a basic material that may or may not be an intrinsic phosphor, to which one or more dopant(s) has been intentionally added. These dopants "activate" the phosphor and cause it to emit infrared, visible, or ultraviolet radiation. For example, in $Gd_2O_2S$:Tb, the Tb atoms (the dopant/activator) give rise to the optical emission of the phosphor. Some phosphors, such as BaFBr, are known as storage phosphors. In these materials, the dopants are involved in the storage as well as the emission of radiation.

Any conventional or useful phosphor can be used, singly or in mixtures, in the imaging layers. For example, useful phosphors are described in numerous references relating to fluorescent intensifying screens, including but not limited to, *Research Disclosure*, Vol. 184, August 1979, item 18431, Section IX, X-ray Screens/Phosphors, and U.S. Pat. No. 2,303,942 (Wynd et al.), U.S. Pat. No. 3,778,615 (Luckey), U.S. Pat. No. 4,032,471 (Luckey), U.S. Pat. No. 4,225,653 (Brixner et al.), U.S. Pat. No. 3,418,246 (Royce), U.S. Pat. No. 3,428,247 (Yocon), U.S. Pat. No. 3,725,704 (Buchanan et al.), U.S. Pat. No. 2,725,704 (Swindells), U.S. Pat. No. 3,617,743 (Rabatin), U.S. Pat. No. 3,974,389 (Ferri et al.), U.S. Pat. No. 3,591,516 (Rabatin), U.S. Pat. No. 3,607,770 (Rabatin), U.S. Pat. No. 3,666,676 (Rabatin), U.S. Pat. No. 3,795,814 (Rabatin), U.S. Pat. No. 4,405,691 (Yale), U.S. Pat. No. 4,311,487 (Luckey et al.), U.S. Pat. No. 4,387,141 (Patten), U.S. Pat. No. 5,021,327 (Bunch et al.), U.S. Pat. No. 4,865,944 (Roberts et al.), U.S. Pat. No. 4,994,355 (Dickerson et al.), U.S. Pat. No. 4,997,750 (Dickerson et al.), U.S. Pat. No. 5,064,729 (Zegarski), U.S. Pat. No. 5,108,881 (Dickerson et al.), U.S. Pat. No. 5,250,366 (Nakajima et al.), U.S. Pat. No. 5,871,892 (Dickerson et al.), EP 0 491 116A1 (Benzo et al.), the disclosures of all of which are incorporated herein by reference with respect to the phosphors.

Useful classes of phosphors include, but are not limited to, calcium tungstate ($CaWO_4$), activated or unactivated lithium stannates, niobium and/or rare earth activated or unactivated yttrium, lutetium, or gadolinium tantalates, rare earth (such as terbium, lanthanum, gadolinium, cerium, and lutetium)-activated or unactivated middle chalcogen phosphors such as rare earth oxychalcogenides and oxyhalides, and terbium-activated or unactivated lanthanum and lutetium middle chalcogen phosphors.

Still other useful phosphors are those containing hafnium as described for example in U.S. Pat. No. 4,988,880 (Bryan et al.), U.S. Pat. No. 4,988,881 (Bryan et al.), U.S. Pat. No. 4,994,205 (Bryan et al.), U.S. Pat. No. 5,095,218 (Bryan et al.), U.S. Pat. No. 5,112,700 (Lambert et al.), U.S. Pat. No. 5,124,072 (Dole et al.), and U.S. Pat. No. 5,336,893 (Smith et al.), the disclosures of which are all incorporated herein by reference.

Toners

The use of "toners" or derivatives thereof that improve the black-and-white image are essential components of the thermographic and photothermographic materials of this invention. "Toners" are compounds that improve image color by contributing to formation of a warm-black image upon development. They also increase the optical density of the developed image. Without them, images are often faint and yellow or brown. Generally, one or more of the essential triazine-thione compounds described herein as toners are present in an amount of about 0.01% by weight to about 10%, and more preferably about 0.1% by weight to about 10% by weight, based on the total dry weight of the layer in which they are included. The amount can also be defined as being within the range of from about $1\times10^{-5}$ to about 0.1 mol per mole of non-photosensitive source of reducible silver in the thermographic or photothermographic material. Toners may be incorporated in one or more of the thermally developable imaging layers as well as in adjacent layers such as a protective overcoat or underlying "carrier" layer. The toners can be located on both sides of the support if thermally developable imaging layers are present on both sides of the support.

It is essential that the thermally developable materials of this invention include one or more triazine-thione compounds that are represented by the following Structure (I):

(I)

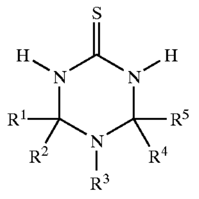

wherein $R^1$, $R^2$, $R^3$, $R^4$, and $R^5$ individually represent a substituent attached to the triazine-thione ring by a single bond.

More specifically, in Structure (I), $R^1$, $R^2$, $R^4$, and $R^5$ independently represent the same or different substituents attached to the triazine-thione ring by a single bond. Such substituents include but are not limited to, hydrogen, straight chain or branched alkyl groups having 1 to 20 carbon atoms (such as methyl, ethyl, iso-propyl, t-butyl, n-pentyl, n-hexyl, dodecyl, hydroxymethyl, methoxymethyl, carboxyethyl, and carboxamidoethyl), cycloalkyl groups having 5 to 10 carbon atoms in the ring (such as cyclopentyl, cyclohexyl, and 4-methylcyclohexyl), alkenyl groups having 2 to 12 carbon atoms (such as propenyl, 2-butenyl, and 3-pentenyl), alkynyl groups having 2 to 12 carbon atoms (such as propargyl and 3-pentynyl), aralkyl groups having 7 to 20 carbon atoms (such as benzyl, phenethyl or 1- or 2-naphthylmethylene, and 1-methyl-2-phenylethyl), aryl groups having 6 to 10 carbon atoms in the ring (such as, phenyl, naphthyl, methylphenyl, ethylphenyl, biphenylyl, and xylyl), and aromatic or non-aromatic heterocyclic groups having 5 to 8 carbon, nitrogen, sulfur, and/or oxygen atoms in the ring (such as pyridyl, furyl, imidazolyl, piperidinyl, morpholyl, thienyl, and 1H-1,2,4-triazol-3-yl).

In addition, $R^1$, $R^2$, $R^4$, and $R^5$ can independently represent a divalent, trivalent, or tetravalent linking group including but not limited to, substituted or unsubstituted alkylene groups having 1 to 12 carbon atoms, substituted or unsubstituted cycloalkylene groups having 5 to 8 carbon atoms in the ring structure, substituted or unsubstituted arylene groups having 6 to 10 carbon atoms in the ring structure, substituted or unsubstituted divalent heterocyclyl groups having 5 to 10 carbon, nitrogen, oxygen, and/or sulfur atoms in the ring structure, or any combination of two or more of these divalent groups directly connected to each other, or any two or more of these groups connected by ether, thioether, carbonyl, carbonamido, sulfoamido, amino, imido, thiocarbonyl, thioamido, sulfinyl, sulfonyl, or phosphinyl groups.

Other useful substituents for $R^1$, $R^2$, $R^4$, and $R^5$ would be readily apparent to one skilled in the art.

Also in Structure (I) $R^3$ represents hydrogen, straight chain or branched alkyl groups having 1 to 20 carbon atoms (such as methyl, ethyl, iso-propyl, t-butyl, n-pentyl, n-hexyl, dodecyl, hydroxymethyl, methoxymethyl, carboxyethyl, and carboxamidoethyl), cycloalkyl groups having 5 to 10 carbon atoms in the ring (such as cyclopentyl, cyclohexyl, and 4-methylcyclohexyl), alkenyl groups having 2 to 12 carbon atoms (such as propenyl, 2-butenyl, and 3-pentenyl), alkynyl groups having 2 to 12 carbon atoms (such as propargyl and 3-pentynyl), aralkyl groups having 7 to 20 carbon atoms (such as benzyl, phenethyl or 1- or 2-naphthylmethylene, and 1-methyl-2-phenylethyl), aryl groups having 6 to 10 carbon atoms in the ring (such as, phenyl, naphthyl, methylphenyl, ethylphenyl, biphenylyl, and xylyl), aromatic or non-aromatic heterocyclic groups having 5 to 8 carbon, nitrogen, sulfur, and/or oxygen atoms in the ring (such as pyridyl, furyl, imidazolyl, piperidinyl, morpholyl, thienyl, and 1H-1,2,4-triazol-3-yl), alkoxy groups having 1 to 12 carbon atoms (such as methoxy, 2-ethoxy, butoxy, 6-hexoxy, 2-ethylhexyloxy, ethoxyethoxy, and methoxyethoxy), aryloxy groups having 6 to 10 carbon atoms in the aryl portion of the group (such as phenoxy and naphthoxy), alkyl(or aryl)-$SO_2$— groups wherein aryl and alkyl are defined above, alkyl(or aryl)-SO— groups wherein aryl and alkyl are defined above, alkyl(or aryl)-(C═O)— groups wherein aryl and alkyl are defined above, alkyl(or aryl)-(C═O)O— groups wherein aryl and alkyl are defined above, alkyl(or aryl)-O(C═O)— groups wherein aryl and alkyl are defined above, R"R'"N(C═O)—, or R"R'"$NSO_2$— groups, wherein R" and R'" are independently hydrogen, alkyl or aryl groups as defined above.

In addition, $R^3$ can be a divalent, trivalent, or tetravalent linking group including but not limited to substituted or unsubstituted alkylene groups having 1 to 12 carbon atoms, substituted or unsubstituted cycloalkylene groups having 5 to 8 carbon atoms in the ring structure, substituted or unsubstituted arylene groups having 6 to 10 carbon atoms in the ring structure, substituted or unsubstituted divalent heterocyclyl groups having 5 to 10 carbon, nitrogen, oxygen, and/or sulfur atoms in the ring structure, or any combination of two or more of these divalent groups directly connected to each other, or any two or more of these groups connected by ether, thioether, carbonyl, carbonamido, sulfoamido, amino, imido, thiocarbonyl, thioamido, sulfinyl, sulfonyl, or phosphinyl groups. Other useful substituents for $R^3$ would be readily apparent to one skilled in the art.

The substituents described above for $R^1$, $R^2$, $R^3$, $R^4$, and $R^5$ may be further substituted, where possible, with for example, alkyl groups, cycloalkyl groups, alkenyl groups, aryl groups, heterocyclyl groups, hydroxyl groups, halogen groups, nitro groups, alkylthio groups, arylthio groups, alkoxy groups, aryloxy groups, amino groups, acylamino groups (such as acetylamino, benzoylamino, octanoylamino, and 2-ethylhexanoylamino), ureido groups (such as unsubstituted ureido, N-methylureido, N-phenylureido, hexylureido, and octylureido), thioureido groups (such as unsubstituted thioureido, N-methylthioureido, and N-phenyl-thioureido), urethane groups (such as methoxy-carbonylamino and phenoxy-carbonylamino), sulfonamido groups (such as methanesulfonamido and benzene-sulfonamido), sulfamoyl groups (such as unsubstituted sulfamoyl group, N,N-dimethylsulfamoyl, N-phenylsulfamoyl, and dibutylsulfamoyl), carbamoyl groups (such as unsubstituted carbamoyl, N,N-diethylcarbamoyl, N-phenylcarbamoyl, octylcarbamoyl, and dodecylcarbamoyl), sulfonyl groups (such as methanesulfonyl and toluenesulfonyl), sulfinyl groups (such as methylsulfinyl and phenylsulfinyl), oxycarbonyl groups (such as methoxycarbonyl, ethoxycarbonyl, hexyloxycarbonyl, and phenoxycarbonyl), acyl groups (such as acetyl, benzoyl, formyl, pivaloyl, and octanoyl), acyloxy groups (such as acetoxy, benzoyloxy, and octanoyloxy), phosphoric acid amido groups (such as N,N-diethylphosphoric-amido), cyano groups, sulfo groups, carboxy groups, and phosphono groups. Other substituents would be readily apparent to one skilled in the art. All of these substituents have well known chemical meanings and can be of any appropriate chemical size.

As noted above, $R^1$, $R^2$, $R^3$, $R^4$, and $R^5$ may also represent the same or different divalent, trivalent, or tetravalent organic substituents that function as a linking group capable of linking one or more molecules having a triazine-thione ring shown in Structure (I). Thus, the term "substituent" is also intended to include linking groups that are attached to the triazine-thione ring of Structure (I) by a single bond and also attached to the triazine-thione ring of one or more other Structures (I) by a single bond. In such situations, the other substituents on each triazine-thione ring may be the same or different.

Preferred linking groups represented by $R^1$, $R^2$, $R^3$, $R^4$, and $R^5$ comprise 2 to 10 carbon, sulfur, and oxygen atoms in the chain. More preferably, only one linking group is present in each molecule represented by Structure (I).

Preferably, $R^1$, $R^2$, $R^3$, $R^4$, and $R^5$ individually represent hydrogen, a straight chain or branched alkyl group having 1 to 12 carbon atoms, acycloalkyl group having 5 to 7-carbon atoms, a carboxyalkyl group having 2 to 6 carbon atoms, a hydroxyalkyl group having 2 to 6 carbon atoms, an alkylene linking group having 2 to 12 carbon atoms, a phenyl group, or an alkylene oxide linking group having 2 to 12 carbon atoms.

More preferably $R^1$, $R^2$, $R^4$, and $R^5$ are each hydrogen.

It is well known that heterocyclic compounds exist in tautomeric forms. In triazine-thiones, thiol-thione tautomerism is possible as shown in the following structures.

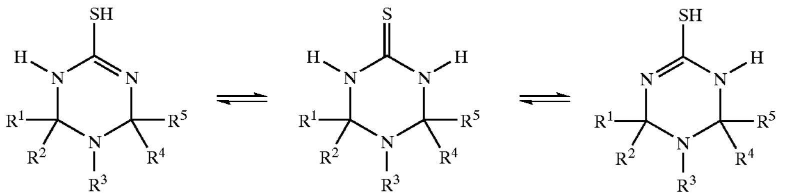

Thiol form Thione form Thiol form

Interconversion among these tautomers can occur rapidly and individual tautomers are usually not isolable, although one tautomeric form may predominate. For the triazine-thiones of this invention, the thione structural formalism is used with the understanding that thiol tautomers do exist.

Representative compounds having Structure (I) useful as toners in the practice of the present invention include the following Compounds I-1 to I-68:

(I-1)

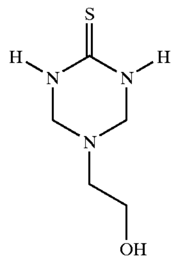

(I-2)

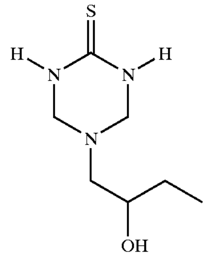

(I-3)

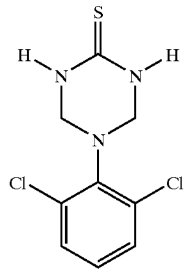

(I-4)

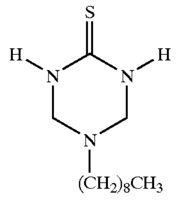

-continued
(I-5)
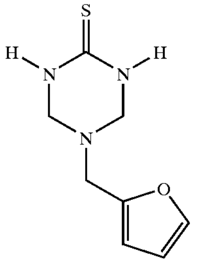
(I-6)
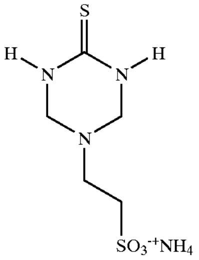
(I-7)
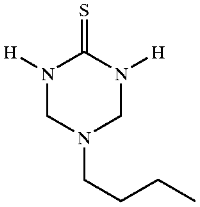
(I-8)
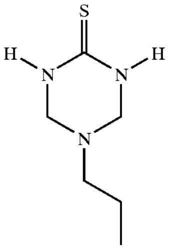
(I-9)
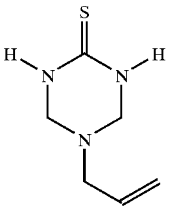
(I-10)
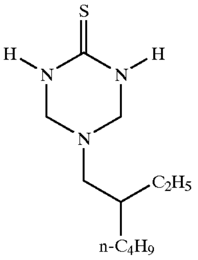
-continued
(I-11)
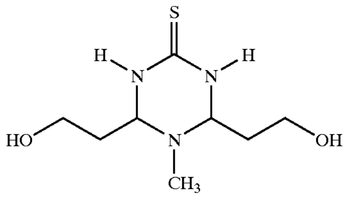
(I-12)
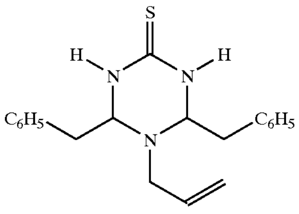
(I-13)
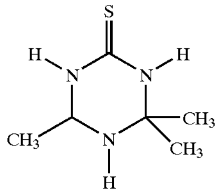
(I-14)
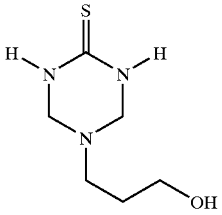
(I-15)
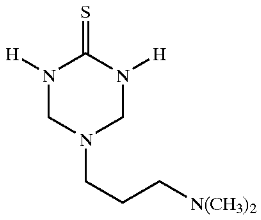
(I-16)
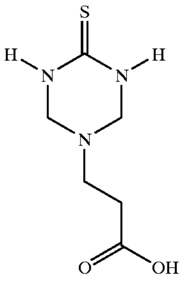
(I-17)
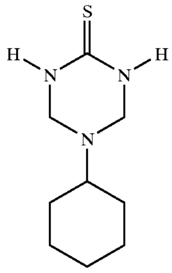

-continued
(I-18)
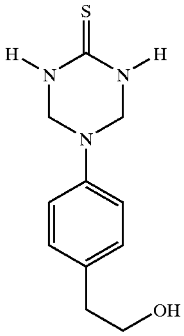
(I-19)
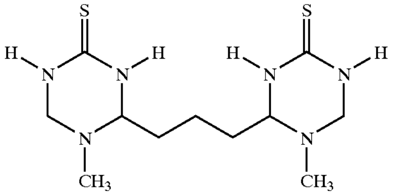
(I-20)
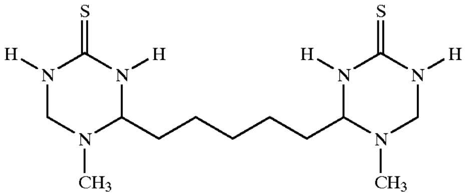
(I-21)
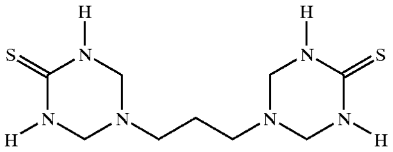
(I-22)
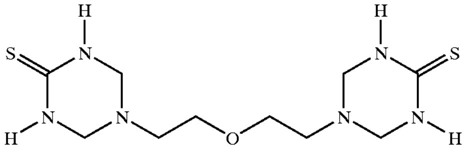
(I-23)
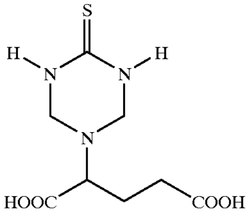
(I-24)
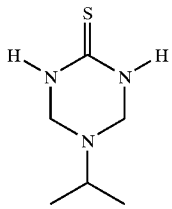
-continued
(I-25)
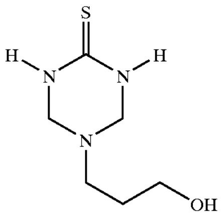
(I-26)
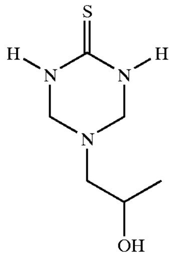
(I-27)
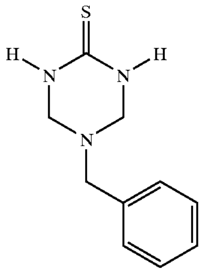
(I-28)
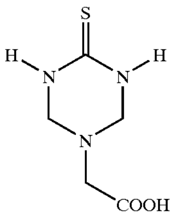
(I-29)
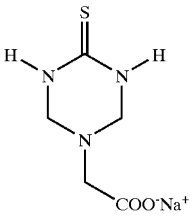
(I-30)
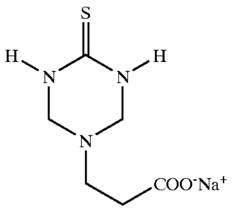

-continued
(I-31)
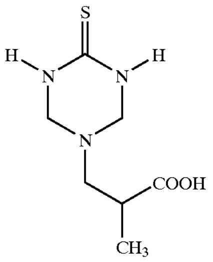
(I-32)
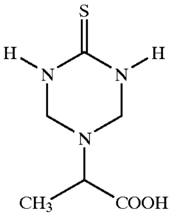
(I-33)
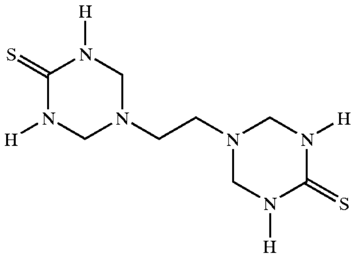
(I-34)
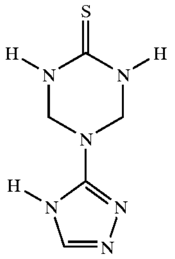
(I-35)
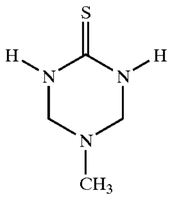
(I-36)
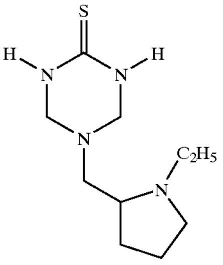
-continued
(I-37)
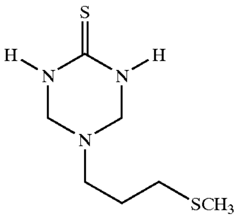
(I-38)
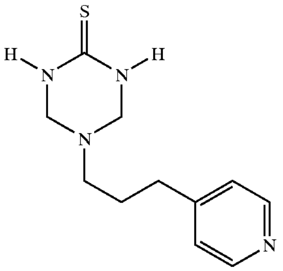
(I-39)
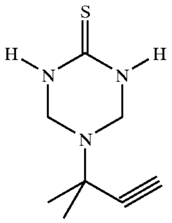
(I-40)
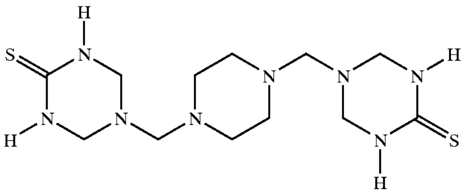
(I-41)
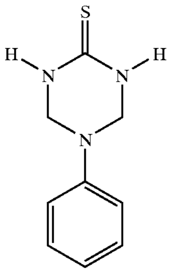
(I-42)
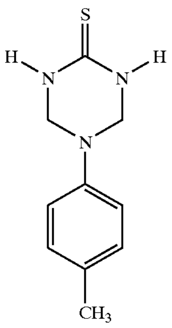

-continued
(I-43)
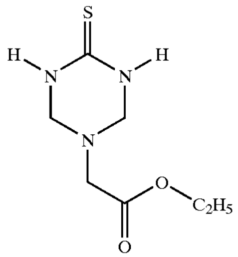
(I-44)
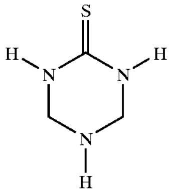
(I-45)
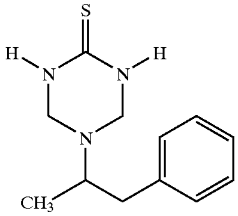
(I-46)
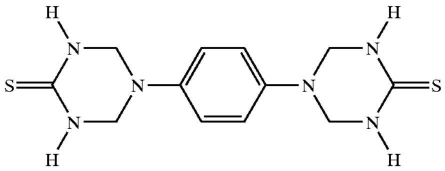
(I-47)
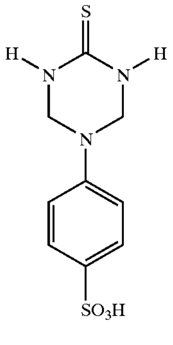
(I-48)
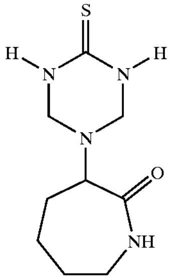
-continued
(I-49)
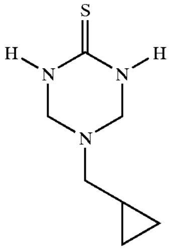
(I-50)
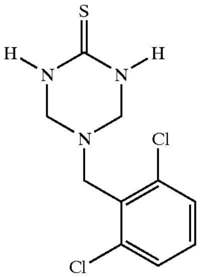
(I-51)
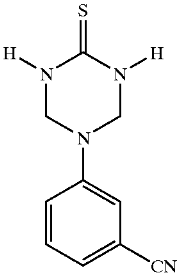
(I-52)
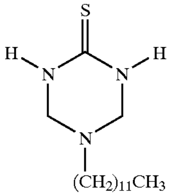
(I-53)
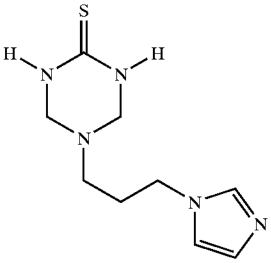
(I-54)
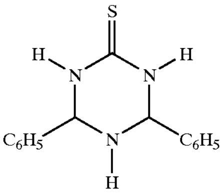

-continued
(I-55)
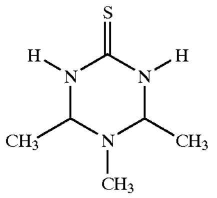
(I-56)
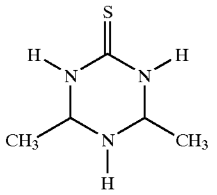
(I-57)
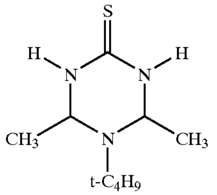
(I-58)
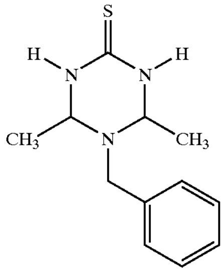
(I-59)
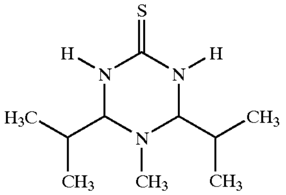
(I-60)
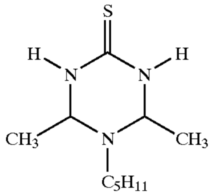
(I-61)
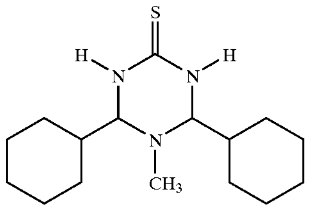
-continued
(I-62)
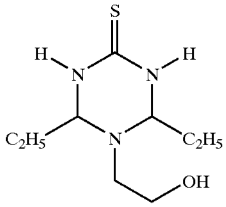
(I-63)
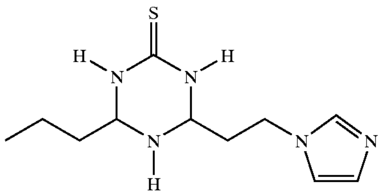
(I-64)
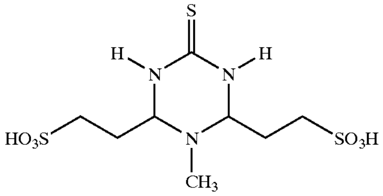
(I-65)
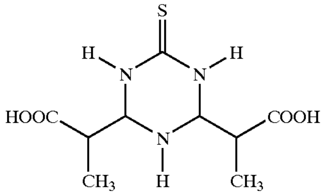
(I-66)
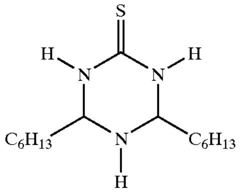
(I-67)
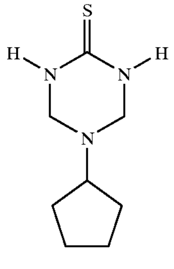
(I-68)
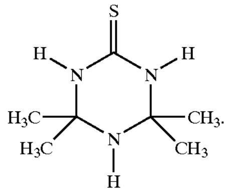
Mixtures of two or more of the noted compounds can be used if desired, and Compounds I-1, I-16, I-17, I-24, I-35, and mixtures thereof are preferred.

As would be understood by one skilled in the art, two or more triazine-thione toners as defined by Structure (I) can be used in the practice of this invention if desired, and the multiple toners can be located in the same or different layers on the same or different sides of the support of the thermally developable materials.

The triazine-thione compounds useful in the present invention can be prepared by standard methods well known to those skilled in the art, such as those described in U.S. Pat. No. 3,712,818 (Nittel et al.) U.S. Pat. No. 4,776,879 (Hawkins et al.), GB Patent 1,441,730 (Steinke et al.), JP Kokai 36-016629 (Ueda et al.), and D. B. Lazarev et al. *Russ. J Gen. Chem.,* 2000, 70(3), 442–449, and references cited therein. All of the above documents are incorporated herein by reference. Some triazine-thiones are commercially available from Ryan Scientific (Isle of Palms, S.C.).

While the essential toners are defined by Structure (I) noted above, to achieve high sensitivity and low $D_{min}$, the thermally developable materials of this invention can also include one or more other compounds that are known in the art as "toners," as described for example in U.S. Pat. No. 3,080,254 (Grant, Jr.), U.S. Pat. No. 3,847,612 (Winslow), U.S. Pat. No. 4,123,282 (Winslow), U.S. Pat. No. 4,082,901 (Laridon et al.), U.S. Pat. No. 3,074,809 (Owen), U.S. Pat. No. 3,446,648 (Workman), U.S. Pat. No. 3,844,797 (Willems et al.), U.S. Pat. No. 3,951,660 (Hagemann et al.), U.S. Pat. No. 5,599,647 (Defieuw et al.) and GB 1,439,478 (AGFA).

Additional useful toners are substituted and unsubstituted mercaptotriazoles as described for example in U.S. Pat. No. 3,832,186 (Masuda et al.), U.S. Pat. No. 6,165,704 (Miyake et al.), U.S. Pat. No. 5,149,620 (Simpson et al.), and copending and commonly assigned U.S. Ser. No. 10/193,443 (filed Jul. 11, 2002 by Lynch, Zou, and Ulrich) and U.S. Ser. No. 10/192,944 (filed Jul. 11, 2002 by Lynch, Ulrich, and Zou), all of which are incorporated herein by reference.

Particularly useful are the phthalazine compounds described in copending and commonly assigned U.S. Ser. No. 10/281,525 (filed Oct. 28, 2002 by Ramsden and Zou), incorporated herein by reference.

Examples of such toners include, but are not limited to, phthalimide and N-hydroxyphthalimide, cyclic imides (such as succinimide), pyrazoline-5-ones, quinazolinone, 1-phenylurazole, 3-phenyl-2-pyrazoline-5-one, and 2,4-thiazolidinedione, naphthalimides (such as N-hydroxy-1,8-naphthalimide), cobalt complexes [such as hexaaminecobalt (3+) trifluoroacetate], mercaptans (such as 3-mercapto-1,2,4-triazole, 2,4-dimercaptopyrimidine, 3-mercapto-4-benzyl-1,2,4-triazole, 3-mercapto-4-phenyl-1,2,4-triazole, 3-mercapto-4,5-diphenyl-1,2,4-triazole and 2,5-dimercapto-1,3,4-thiadiazole), N-(amino-methyl) aryldicarboximides (such as (N,N-dimethylaminomethyl)phthalimide), and N-(dimethylaminomethyl)naphthalene-2,3-dicarboximide, a combination of blocked pyrazoles, isothiuronium derivatives, and certain photobleach agents [such as a combination of N,N'-hexamethylene-bis(1-carbamoyl-3,5-dimethyl-pyrazole), 1,8-(3,6-diazaoctane)bis (isothiuronium)trifluoroacetate, and 2-(tribromomethylsulfonyl benzothiazole)], merocyanine dyes {such as 3-ethyl-5-[(3-ethyl-2-benzothiazolinylidene)-1-methyl-ethylidene]-2-thio-2,4-o-azolidine-dione}, phthalazine and derivatives thereof [such as those described in U.S. Pat. No. 6,146,822 (Asanuma et al.)], phthalazinone and phthalazinone derivatives, or metal salts or these derivatives [such as 4-(1-naphthyl)phthalazinone, 6-chlorophthalazinone, 5,7-dimethoxyphthalazinone, and 2,3-dihydro-1,4-phthalazinedione], a combination of phthalazine (or derivative thereof) plus one or more phthalic acid derivatives (such as phthalic acid, 4-methylphthalic acid, 4-nitrophthalic acid, and tetrachlorophthalic anhydride), quinazolinediones, benzoxazine or naphthoxazine derivatives, rhodium complexes functioning not only as tone modifiers but also as sources of halide ion for silver halide formation in situ [such as ammonium hexachlororhodate (3+), rhodium bromide, rhodium nitrate, and potassium hexachlororhodate (3+)], benzoxazine-2,4-diones (such as 1,3-benzoxazine-2,4-dione, 8-methyl-1,3-benzoxazine-2,4-dione and 6-nitro-1,3-benzoxazine-2,4-dione), pyrimidines and asym-triazines (such as 2,4-dihydroxypyrimidine, 2-hydroxy-4-aminopyrimidine and azauracil) and tetraazapentalene derivatives [such as 3,6-dimercapto-1,4-diphenyl-1H,4H-2,3a,5,6a-tetraazapentalene and 1,4-di-(o-chlorophenyl)-3,6-dimercapto-1H,4H-2,3a,5,6a-tetraazapentalene].

Other Addenda

The thermographic and photothermographic materials of the invention can also contain other additives such as shelf-life stabilizers, antifoggants, contrast enhancing agents, development accelerators, acutance dyes, post-processing stabilizers or stabilizer precursors, thermal solvents (also known as melt formers), humectants, and other image-modifying agents as would be readily apparent to one skilled in the art.

To further control the properties of photothermographic materials, (for example, contrast, $D_{min}$, speed, or fog), it may be preferable to add one or more heteroaromatic mercapto compounds or heteroaromatic disulfide compounds of the formulae Ar—S-$M^1$ and Ar—S—S—Ar, wherein $M^1$ represents a hydrogen atom or an alkali metal atom and Ar represents a heteroaromatic ring or fused hetero-aromatic ring containing one or more of nitrogen, sulfur, oxygen, selenium, or tellurium atoms. Preferably, the heteroaromatic ring comprises benzimidazole, naphthimidazole, benzothiazole, naphthothiazole, benzoxazole, naphthoxazole, benzoselenazole, benzotellurazole, imidazole, oxazole, pyrazole, triazole, thiazole, thiadiazole, tetrazole, triazine, pyrimidine, pyridazine, pyrazine, pyridine, purine, quinoline, or quinazolinone. Compounds having other heteroaromatic rings and compounds providing enhanced sensitization at other wavelengths are also envisioned to be suitable. For example, heteroaromatic mercapto compounds are described as supersensitizers for infrared photothermographic materials in EP 0 559 228 B1 (Philip Jr. et al.).

The photothermographic materials of the present invention can be further protected against the production of fog and can be stabilized against loss of sensitivity during storage. While not necessary for the practice of the invention, it may be advantageous to add mercury (II) salts to the emulsion layer(s) as an antifoggant. Preferred mercury (II) salts for this purpose are mercuric acetate and mercuric bromide. Other useful mercury salts include those described in U.S. Pat. No. 2,728,663 (Allen).

Other suitable antifoggants and stabilizers that can be used alone or in combination include thiazolium salts as described in U.S. Pat. No. 2,131,038 (Staud) and U.S. Pat. No. 2,694,716 (Allen), azaindenes as described in U.S. Pat. No. 2,886,437 (Piper), triazaindolizines as described in U.S. Pat. No. 2,444,605 (Heimbach), the urazoles described in U.S. Pat. No. 3,287,135 (Anderson), sulfocatechols as described in U.S. Pat. No. 3,235,652 (Kennard), the oximes described in GB 623,448 (Carrol et al.), polyvalent metal salts as described in U.S. Pat. No. 2,839,405 (Jones), thiuronium salts as described in U.S. Pat. No. 3,220,839

(Herz), palladium, platinum, and gold salts as described in U.S. Pat. No. 2,566,263 (Trirelli) and U.S. Pat. No. 2,597,915 (Damshroder), compounds having —$SO_2CBr_3$ groups as described for example in U.S. Pat. No. 5,594,143 (Kirk et al.) and U.S. Pat. No. 5,374,514 (Kirk et al.), and 2-(tribromomethylsulfonyl)quinoline compounds as described in U.S. Pat. No. 5,460,938 (Kirk et al.).

Stabilizer precursor compounds capable of releasing stabilizers upon application of heat during development can also be used. Such precursor compounds are described in for example, U.S. Pat. No. 5,158,866 (Simpson et al.), U.S. Pat. No. 5,175,081 (Krepski et al.), U.S. Pat. No. 5,298,390 (Sakizadeh et al.), and U.S. Pat. No. 5,300,420 (Kenney et al.).

In addition, certain substituted-sulfonyl derivatives of benzotriazoles (for example alkylsulfonylbenzotriazoles and arylsulfonylbenzotriazoles) have been found to be useful stabilizing compounds (such as for post-processing print stabilizing), as described in U.S. Pat. No. 6,171,767 (Kong et al.).

Furthermore, other specific useful antifoggants/stabilizers are described in more detail in U.S. Pat. No. 6,083,681 (Lynch et al.), incorporated herein by reference.

The photothermographic materials may also include one or more polyhalo antifoggants that include one or more polyhalo substituents including but not limited to, dichloro, dibromo, trichloro, and tribromo groups. The antifoggants can be aliphatic, alicyclic or aromatic compounds, including aromatic heterocyclic and carbocyclic compounds.

Particularly useful antifoggants of this type are polyhalo antifoggants, such as those having a —$SO_2C(X')_3$ group wherein X' represents the same or different halogen atoms.

Another class of useful antifoggants includes those compounds described in copending and commonly assigned U.S. Ser. No. 10/014,961 (filed Dec. 11, 2001 by Burgmaier and Klaus), incorporated herein by reference.

Advantageously, the photothermographic materials of this invention also include one or more thermal solvents (also called "heat solvents," "thermosolvents," "melt formers," "melt modifiers," "eutectic formers," "development modifiers," "waxes," or "plasticizers") for improving the reaction speed of the silver-developing redox reaction at elevated temperature.

By the term "thermal solvent" in this invention is meant an organic material which becomes a plasticizer or liquid solvent for at least one of the imaging layers upon heating at a temperature above 60° C. Useful for that purpose are polyethylene glycols having a mean molecular weight in the range of 1,500 to 20,000 described in U.S. Pat. No. 3,347,675. Further are mentioned compounds such as urea, methyl sulfonamide and ethylene carbonate being thermal solvents described in U.S. Pat. No. 3,667,959, and compounds such as tetrahydro-thiophene-1,1-dioxide, methyl anisate and 1,10-decanediol being described as thermal solvents in *Research Disclosure*, December 1976, item 15027, pp. 26–28. Other representative examples of such compounds include, but are not limited to, niacinamide, hydantoin, 5,5-dimethylhydantoin, salicylanilide, phthalimide, N-hydroxyphthalimide, N-potassium-phthalimide, succinimide, N-hydroxy-1,8-naphthalimide, phthalazine, 1-(2H)-phthalazinone, 2-acetylphthalazinone, benzanilide, 1,3-dimethylurea, 1,3-diethylurea, 1,3-diallylurea, meso-erythritol, D-sorbitol, tetrahydro-2-pyrimidone, glycouril, 2-imidazolidone, 2-imidazolidone-4-carboxylic acid, and benzenesulfonamide. Combinations of these compounds can also be used including, for example, a combination of succinimide and 1,3-dimethylurea. Known thermal solvents are disclosed, for example, in U.S. Pat. No. 6,013,420 (Windender), U.S. Pat. No. 3,438,776 (Yudelson), U.S. Pat. No. 5,368,979 (Freedman et al.), U.S. Pat. No. 5,716,772 (Taguchi et al.), U.S. Pat. No. 5,250,386 (Aono et al.), and in *Research Disclosure*, December 1976, item 15022.

Binders

The photocatalyst (such as photosensitive silver halide, when used), the non-photosensitive source of reducible silver ions, the reducing agent composition, toner(s), and any other additives used in the present invention are added to and coated in one or more binders. Thus, aqueous-based formulations are be used to prepare the photothermographic materials of this invention. Mixtures of different types of hydrophilic binders can also be used.

Examples of useful hydrophilic binders include, but are not limited to, proteins and protein derivatives, gelatin and gelatin derivatives (hardened or unhardened, including alkali- and acid-treated gelatins, and deionized gelatin), cellulosic materials such as hydroxymethyl cellulose and cellulosic esters, acrylamide/methacrylamide polymers, acrylic/methacrylic polymers, polyvinyl pyrrolidones, polyvinyl alcohols, poly(vinyl lactams), polymers of sulfoalkyl acrylate or methacrylates, hydrolyzed polyvinyl acetates, polyamides, polysaccharides (such as dextrans and starch ethers), and other naturally occurring or synthetic vehicles commonly known for use in aqueous-based photographic emulsions (see for example *Research Disclosure*, item 38957, noted above). Cationic starches can also be used as peptizers for emulsions containing tabular grain silver halides as described in U.S. Pat. No. 5,620,840 (Maskasky) and U.S. Pat. No. 5,667,955 (Maskasky).

Particularly useful hydrophilic binders are gelatin, gelatin derivatives, polyvinyl alcohols, and cellulosic materials. Gelatin and its derivatives are most preferred, and comprise at least 75% by weight of total binders when a mixture of binders is used.

Hydrophobic binders can also be used. Examples of typical hydrophobic binders include, but are not limited to, polyvinyl acetals, polyvinyl chloride, polyvinyl acetate, cellulose acetate, cellulose acetate butyrate, polyolefins, polyesters, polystyrenes, polyacrylonitrile, polycarbonates, methacrylate copolymers, maleic anhydride ester copolymers, butadiene-styrene copolymers, and other materials readily apparent to one skilled in the art. Copolymers (including terpolymers) are also included in the definition of polymers. The polyvinyl acetals (such as polyvinyl butyral and polyvinyl formal) and vinyl copolymers (such as polyvinyl acetate and polyvinyl chloride) are particularly preferred. Particularly suitable binders are polyvinyl butyral resins that are available as BUTVAR® B79 (Solutia, Inc.) and PIOLOFORM® BS-18 or PIOLOFORM® BL-16 (Wacker Chemical Company).

Aqueous dispersions (or latexes) of hydrophobic binders may also be used. Such dispersions are described in, for example, U.S. Pat. No. 4,504,575 (Lee), U.S. Pat. No. 6,083,680 (Ito et al), U.S. Pat. No. 6,100,022 (Inoue et al.), U.S. Pat. No. 6,132,949 (Fujita et al.), U.S. Pat. No. 6,132,950 (Ishigaki et al.), U.S. Pat. No. 6,140,038 (Ishizuka et al.), U.S. Pat. No. 6,150,084 (Ito et al.), U.S. Pat. No. 6,312,885 (Fujita et al.), U.S. Pat. No. 6,423,487 (Naoi), all of which are incorporated herein by reference.

Hardeners for various binders may be present if desired. Useful hardeners are well known and include diisocyanate compounds as described for example, in EP 0 600 586 B1 (Philip, Jr. et al.) and vinyl sulfone compounds as described in U.S. Pat. No. 6,143,487 (Philip, Jr. et al.), and EP 0 640 589 A 1 (Gathmann et al.), aldehydes and various other hardeners as described in U.S. Pat. No. 6,190,822 (Dickerson et al.). The hydrophilic binders used in the photothermographic materials are generally partially or fully hardened using any conventional hardener. Useful hardeners are well known and are described, for example, in T. H. James, *The Theory of the Photographic Process*, Fourth Edition, Eastman Kodak Company, Rochester, N.Y., 1977, Chapter 2, pp. 77–8.

Where the proportions and activities of the photothermographic materials require a particular developing time and temperature, the binder(s) should be able to withstand those conditions. Generally, it is preferred that the binder does not decompose or lose its structural integrity at 120° C. for 60 seconds. It is more preferred that it does not decompose or lose its structural integrity at 177° C. for 60 seconds.

The polymer binder(s) is used in an amount sufficient to carry the components dispersed therein. The effective range can be appropriately determined by one skilled in the art. Preferably, a binder is used at a level of about 10% by weight to about 90% by weight, and more preferably at a level of about 20% by weight to about 70% by weight, based on the total dry weight of the layer in which it is included. The amount of binders in double-sided photothermographic materials may be the same or different.

Support Materials

The thermographic and photothermographic materials of this invention comprise a polymeric support that is preferably a flexible, transparent film that has any desired thickness and is composed of one or more polymeric materials, depending upon their use. The supports are generally transparent (especially if the material is used as a photomask) or at least translucent, but in some instances, opaque supports may be useful. They are required to exhibit dimensional stability during thermal development and to have suitable adhesive properties with overlying layers. Useful polymeric materials for making such supports include, but are not limited to, polyesters (such as polyethylene terephthalate and polyethylene naphthalate), cellulose acetate and other cellulose esters, polyvinyl acetal, polyolefins (such as polyethylene and polypropylene), polycarbonates, and polystyrenes (and polymers of styrene derivatives). Preferred supports are composed of polymers having good heat stability, such as polyesters and polycarbonates. Support materials may also be treated or annealed to reduce shrinkage and promote dimensional stability. Polyethylene terephthalate film is a particularly preferred support. Various support materials are described, for example, in *Research Disclosure*, August 1979, item 18431. A method of making dimensionally stable polyester films is described in *Research Disclosure*, September 1999, item 42536.

It is also useful to use supports comprising dichroic mirror layers wherein the dichroic mirror layer reflects radiation at least having the predetermined range of wavelengths to the emulsion layer and transmits radiation having wavelengths outside the predetermined range of wavelengths. Such dichroic supports are described in U.S. Pat. No. 5,795,708 (Boutet), incorporated herein by reference.

It is further possible to use transparent, multilayer, polymeric supports comprising numerous alternating layers of at least two different polymeric materials. Such multilayer polymeric supports preferably reflect at least 50% of actinic radiation in the range of wavelengths to which the photothermographic sensitive material is sensitive, and provide photothermographic materials having increased speed. Such transparent, multilayer, polymeric supports are described in WO 02/21208 A1 (Simpson et al.) that is incorporated herein by reference.

Opaque supports such as dyed polymeric films and resin-coated papers that are stable to high temperatures can also be used.

Support materials can contain various colorants, pigments, antihalation or acutance dyes if desired. Support materials may be treated using conventional procedures (such as corona discharge) to improve adhesion of overlying layers, or subbing or other adhesion-promoting layers can be used. Useful subbing layer formulations include those conventionally used for photographic materials such as vinylidene halide polymers.

Thermographic and Photothermographic Formulations

Thermographic and photothermographic materials of the invention can contain plasticizers and lubricants such as polyalcohols and diols of the type described in U.S. Pat. No. 2,960,404 (Milton et al.), fatty acids or esters such as those described in U.S. Pat. No. 2,588,765 (Robijns) and U.S. Pat. No. 3,121,060 (Duane), and silicone resins such as those described in GB 955,061 (DuPont). The materials can also contain matting agents such as starch, titanium dioxide, zinc oxide, silica, and polymeric beads including beads of the type described in U.S. Pat. No. 2,992,101 (Jelley et al.) and U.S. Pat. No. 2,701,245 (Lynn). Polymeric fluorinated surfactants may also be useful in one or more layers of the photothermographic materials for various purposes, such as improving coatability and optical density uniformity as described in U.S. Pat. No. 5,468,603 (Kub).

U.S. Pat. No. 6,436,616 (Geisler et al.) describes various means of modifying photothermographic materials to reduce what is known as the "woodgrain" effect, or uneven optical density. This effect can be reduced or eliminated by several means, including treatment of the support, adding matting agents to the topcoat, using acutance dyes in certain layers or other procedures described therein.

The thermographic and photothermographic materials of this invention can include antistatic or conducting layers. Such layers may contain soluble salts (for example, chlorides or nitrates), evaporated metal layers, or ionic polymers such as those described in U.S. Pat. No. 2,861,056 (Minsk) and U.S. Pat. No. 3,206,312 (Sterman et al.), or insoluble inorganic salts such as those described in U.S. Pat. No. 3,428,451 (Trevoy), electroconductive underlayers such as those described in U.S. Pat. No. 5,310,640 (Markin et al.), electronically-conductive metal antimonate particles such as those described in U.S. Pat. No. 5,368,995 (Christian et al.), and electrically-conductive metal-containing particles dispersed in a polymeric binder such as those described in EP 0 678 776 A1 (Melpolder et al.). Particularly useful conductive particles are the non-acicular metal antimonate particles described in copending and commonly assigned U.S. Ser. No. 10/304,224 (filed on Nov. 27, 2002 by LaBelle, Sakizadeh, Ludemann, Bhave, and Pham). All of the above patents and patent applications are incorporated herein by reference. Other antistatic agents are well known in the art.

Other conductive compositions include one or more fluoro-chemicals each of which is a reaction product of $R_f—CH_2CH_2—SO_3H$ with an amine wherein $R_f$ comprises 4 or more fully fluorinated carbon atoms. These antistatic compositions are described in more detail in copending and commonly assigned U.S. Ser. No. 10/107,551 (filed Mar. 27, 2002 by Sakizadeh, LaBelle, Orem, and Bhave) that is incorporated herein by reference.

Additional conductive compositions include one or more fluoro-chemicals having the structure $R_f—R—N(R'_1)(R'_2)(R'_3)^+X^-$ wherein $R_f$ is a straight or branched chain perfluoroalkyl group having 4 to 18 carbon atoms, R is a divalent linking group comprising at least 4 carbon atoms and a sulfide group in the chain, $R'_1$, $R'_2$, $R'_3$ are independently hydrogen or alkyl groups or any two of $R'_1$, $R'_2$, and $R'_3$ taken together can represent the carbon and nitrogen atoms necessary to provide a 5- to 7-membered heterocyclic ring with the cationic nitrogen atom, and $X^-$ is a monovalent anion. These antistatic compositions are described in more detail in copending and commonly assigned U.S. Ser. No. 10/265,058 (filed Oct. 4, 2002 by Sakizadeh, LaBelle, and Bhave), that is incorporated herein by reference.

The thermographic and photothermographic materials of this invention can be constructed of one or more layers on a support. Single layer materials should contain the photocatalyst, the non-photosensitive source of reducible silver ions, the reducing composition, the binder, as well as optional materials such as toners, acutance dyes, coating aids and other adjuvants.

Two-layer constructions comprising a single imaging layer coating containing all the ingredients and a surface protective topcoat are generally found in the materials of this invention. However, two-layer constructions containing photocatalyst and non-photosensitive source of reducible silver ions in one imaging layer (usually the layer adjacent to the support) and the reducing composition and other ingredients in the second imaging layer or distributed between both layers are also envisioned.

For double-sided photothermographic materials, each side of the support can include one or more of the same or different imaging layers, interlayers, and protective topcoat layers. In such materials preferably a topcoat is present as the outermost layer on both sides of the support. The thermally developable layers on opposite sides can have the same or different construction and can be overcoated with the same or different protective layers.

Layers to promote adhesion of one layer to another in thermographic and photothermographic materials are also known, as described for example in U.S. Pat. No. 5,891,610 (Bauer et al.), U.S. Pat. No. 5,804,365 (Bauer et al.), and U.S. Pat. No. 4,741,992 (Przezdziecki). Adhesion can also be promoted using specific polymeric adhesive materials as described for example in U.S. Pat. No. 5,928,857 (Geisler et al.).

Layers to reduce emissions from the film may also be present, including the polymeric barrier layers described in U.S. Pat. No. 6,352,819 (Kenney et al.), U.S. Pat. No. 6,352,820 (Bauer et al.), and U.S. Pat. No. 6,420,102 (Bauer et al.), all incorporated herein by reference.

Thermographic and photothermographic formulations described herein can be coated by various coating procedures including wire wound rod coating, dip coating, air knife coating, curtain coating, slide coating, or extrusion coating using hoppers of the type described in U.S. Pat. No. 2,681,294 (Beguin). Layers can be coated one at a time, or two or more layers can be coated simultaneously by the procedures described in U.S. Pat. No. 2,761,791 (Russell), U.S. Pat. No. 4,001,024 (Dittman et al.), U.S. Pat. No. 4,569,863 (Keopke et al.), U.S. Pat. No. 5,340,613 (Hanzalik et al.), U.S. Pat. No. 5,405,740 (LaBelle), U.S. Pat. No. 5,415,993 (Hanzalik et al.), U.S. Pat. No. 5,525,376 (Leonard), U.S. Pat. No. 5,733,608 (Kessel et al.), U.S. Pat. No. 5,849,363 (Yapel et al.), U.S. Pat. No. 5,843,530 (Jerry et al.), U.S. Pat. No. 5,861,195 (Bhave et al.), and GB 837,095 (Ilford). A typical coating gap for the emulsion layer can be from about 10 to about 750 $\mu$m, and the layer can be dried in forced air at a temperature of from about 20° C. to about 100° C. It is preferred that the thickness of the layer be selected to provide maximum image densities greater than about 0.2, and more preferably, from about 0.5 to 5.0 or more, as measured by a MacBeth Color Densitometer Model TD 504.

When the layers are coated simultaneously using various coating techniques, a "carrier" layer formulation comprising a single-phase mixture of the two or more polymers described above may be used. Such formulations are described in U.S. Pat. No. 6,355,405 (Ludemann et al.).

Mottle and other surface anomalies can be reduced in the materials of this invention by incorporation of a fluorinated polymer as described for example in U.S. Pat. No. 5,532,121 (Yonkoski et al.) or by using particular drying techniques as described, for example in U.S. Pat. No. 5,621,983 (Ludemann et al.).

Preferably, two or more layers are applied to a film support using slide coating. The first layer can be coated on top of the second layer while the second layer is still wet. The first and second fluids used to coat these layers can be the same or different.

While the first and second layers can be coated on one side of the film support, manufacturing methods can also include forming on the opposing or backside of said polymeric support, one or more additional layers, including an antihalation layer, an antistatic layer, or a layer containing a matting agent (such as silica), an imaging layer, a protective topcoat layer, or a combination of such layers.

It is also contemplated that the photothermographic materials of this invention can include thermally developable imaging (or emulsion) layers on both sides of the support and at least one heat-bleachable composition in an antihalation underlayer beneath layers on one or both sides of the support.

Photothermographic materials having thermally developable layers disposed on both sides of the support often suffer from "crossover." Crossover results when radiation used to image one side of the photothermographic material is transmitted through the support and images the photothermographic layers on the opposite side of the support. Such radiation causes a lowering of image quality (especially sharpness). As crossover is reduced, the sharper becomes the image. Various methods are available for reducing crossover. Such "anti-crossover" materials can be materials specifically included for reducing crossover or they can be acutance or antihalation dyes. In either situation, when imaged with visible radiation, it is often necessary that they be rendered colorless during processing.

To promote image sharpness, photothermographic materials according to the present invention can contain one or more layers containing acutance, filter, crossover prevention (anti-crossover), anti-irradiation and/or antihalation dyes. These dyes are chosen to have absorption close to the exposure wavelength and are designed to absorb non-absorbed or scattered light. One or more antihalation dyes may be incorporated into one or more antihalation layers according to known techniques, as an antihalation backing layer, as an antihalation underlayer, or as an antihalation overcoat. Additionally, one or more acutance dyes may be incorporated into one or more layers such as a thermally developable imaging layer, primer layer, underlayer, or topcoat layer (particularly on the frontside) according to known techniques.

Dyes useful as antihalation, filter, crossover prevention (anti-crossover), anti-irradiation and/or acutance dyes include squaraine dyes described in U.S. Pat. No. 5,380,635 (Gomez et al.), U.S. Pat. No. 6,063,560 (Suzuki et al.), U.S. Pat. No. 6,432,340 (Tanaka et al.), U.S. Pat. No. 6,444,415 (Tanaka et al.), and EP 1 083 459 A1 (Kimura), the indolenine dyes described in EP 0 342 810 A1 (Leichter), and the cyanine dyes described in copending and commonly assigned U.S. Ser. No. 10/011,892 (filed Dec. 5, 2001 by Hunt, Kong, Ramsden, and LaBelle). All of the above references are incorporated herein by reference.

It is also useful in the present invention to employ compositions including acutance, filter, crossover prevention (anti-crossover), anti-irradiation and/or antihalation dyes that will decolorize or bleach with heat during processing. Dyes and constructions employing these types of dyes are described in, for example, U.S. Pat. No. 5,135,842 (Kitchin et al.), U.S. Pat. No. 5,266,452 (Kitchin et al.), U.S. Pat. No. 5,314,795 (Helland et al.), U.S. Pat. No. 6,306,566, (Sakurada et al.), U.S. Published Application 2001-0001704 (Sakurada et al.), JP Kokai 2001-142175 (Hanyu et al.), and JP 2001-183770 (Hanye et al.). Also useful are bleaching compositions described in JP Kokai 11-302550 (Fujiwara), JP Kokai 2001-109101 (Adachi), JP 2001-51371 (Yabuki et al.), JP Kokai 2001-22027 (Adachi), JP Kokai 2000-029168 (Noro), and U.S. Pat. No. 6,376,163 (Goswami, et al.). All of the above references are incorporated herein by reference. Particularly useful heat-bleachable acutance, filter, crossover prevention (anti-crossover), anti-irradiation and/or antihalation compositions include a radiation absorbing compound used in combination with a hexaaryl-biimidazole (also known as a "HABI"). Such HABI compounds are well known in the art, such as U.S. Pat. No. 4,196,002 (Levinson et al.), U.S. Pat. No. 5,652,091 (Perry et al.), and U.S. Pat. No. 5,672,562 (Perry et al.), all incorporated herein by reference. Examples of such heat-bleachable compositions are described for example in copending and commonly assigned U.S. Ser. No. 09/875,772 (filed Jun. 6, 2001 by Goswami, Ramsden, Zielinski, Baird, Weinstein, Helber, and Lynch) and U.S. Ser. No. 09/944,573 (filed Aug. 31, 2001 by Ramsden and Baird) both incorporated herein by reference.

Under practical conditions of use, the compositions are heated to provide bleaching at a temperature of at least 90° C. for at least 0.5 seconds.

Imaging/Development

The thermally developable materials of the present invention can be imaged in any suitable manner consistent with the type of material using any suitable imaging source (typically some type of radiation or electronic signal for photothermographic materials and a source of thermal energy for thermographic materials).

In some embodiments, the materials are sensitive to radiation in the range of from about at least 300 nm to about 1400 nm, and preferably from about 300 nm to about 850 nm. Imaging can be achieved by exposing the photothermographic materials of this invention to a suitable source of radiation to which they are sensitive, including ultraviolet radiation, visible light, near infrared radiation and infrared radiation to provide a latent image. Suitable exposure means are well known and include sources of radiation, including: incandescent or fluorescent lamps, xenon flash lamps, lasers, laser diodes, light emitting diodes, infrared lasers, infrared laser diodes, infrared light-emitting diodes, infrared lamps, or any other ultraviolet, visible, or infrared radiation source readily apparent to one skilled in the art, and others described in the art, such as in *Research Disclosure*, September, 1996, item 38957. Particularly useful infrared exposure means include laser diodes, including laser diodes that are modulated to increase imaging efficiency using what is known as multi-longitudinal exposure techniques as described in U.S. Pat. No. 5,780,207 (Mohapatra et al.). Other exposure techniques are described in U.S. Pat. No. 5,493,327 (McCallum et al.).

The materials can be made sensitive to X-radiation or radiation in the ultraviolet region of the spectrum, the visible region of the spectrum, or the infrared region of the electromagnetic spectrum. Useful X-radiation imaging sources include general medical, mammographic, dental, industrial X-ray units, and other X-radiation generating equipment known to one skilled in the art.

Thermal development conditions will vary, depending on the construction used but will typically involve heating the imagewise exposed material at a suitably elevated temperature. Thus, the latent image can be developed by heating the exposed material at a moderately elevated temperature of, for example, from about 50° C. to about 250° C. (preferably from about 80° C. to about 200° C. and more preferably from about 100° C. to about 200° C.) for a sufficient period of time, generally from about 1 to about 120 seconds. Heating can be accomplished using any suitable heating means such as a hot plate, a steam iron, a hot roller or a heating bath.

In some methods, the development is carried out in two steps. Thermal development takes place at a higher temperature for a shorter time (for example at about 150° C. for up to 10 seconds), followed by thermal diffusion at a lower temperature (for example at about 80° C.) in the presence of a transfer solvent.

When imaging thermographic materials of this invention, the image may be "written" simultaneously with development at a suitable temperature using a thermal stylus, a thermal print head or a laser, or by heating while in contact with a heat-absorbing material. The thermographic materials may include a dye (such as an IR-absorbing dye) to facilitate direct development by exposure to laser radiation. The dye converts absorbed radiation to heat.

Use as a Photomask

The thermographic and photothermographic materials of the present invention are sufficiently transmissive in the range of from about 350 to about 450 nm in non-imaged areas to allow their use in a method where there is a subsequent exposure of an ultraviolet or short wavelength visible radiation sensitive imageable medium. For example, imaging the photothermographic material and subsequent development affords a visible image. The heat-developed thermographic or photothermographic material absorbs ultraviolet or short wavelength visible radiation in the areas where there is a visible image and transmits ultraviolet or short wavelength visible radiation where there is no visible image. The heat-developed material may then be used as a mask and positioned between a source of imaging radiation (such as an ultraviolet or short wavelength visible radiation energy source) and an imageable material that is sensitive to such imaging radiation, such as a photopolymer, diazo material, photoresist, or photosensitive printing plate. Exposing the imageable material to the imaging radiation through the visible image in the exposed and heat-developed photothermographic material provides an image in the imageable material. This method is particularly useful where the imageable medium comprises a printing plate and the photothermographic material serves as an imagesetting film.

Thus, in one embodiment, the present invention provides a method comprising:

A) imagewise exposing a photothermographic material of the present invention to electromagnetic radiation to form a latent image, and B) simultaneously or sequentially, beating the exposed photothermographic material to develop the latent image into a visible image.

Where the photothermographic material comprises a transparent support, this image-forming method can further comprise:

C) positioning the exposed and heat-developed photothermographic material with the visible image therein between a source of imaging radiation and an imageable material that is sensitive to the imaging radiation, and
D) exposing the imageable material to the imaging radiation through the visible image in the exposed and heat-developed photothermographic material to provide an image in the imageable material.

Thus, in one embodiment, the present invention provides a method comprising:

A) thermal imaging of the thermographic material of the present invention.

Where the thermographic material comprises a transparent support, this image-forming method can further comprise:

B) positioning the thermally imaged thermographic material between a source of imaging radiation and an imageable material that is sensitive to the imaging radiation, and
C) exposing the imageable material to the imaging radiation through the visible image in the thermally imaged thermographic material to provide an image in the imageable material.

Imaging Assemblies

To further increase photospeed, the X-radiation sensitive photothermographic materials of this invention may be used in association with one or more phosphor intensifying screens and/or metal screens in what is known as "imaging assemblies." An intensifying screen absorbs X-radiation and emits longer wavelength electromagnetic radiation that the photosensitive silver halide more readily absorbs. Double-coated X-radiation sensitive photothermographic materials (that is, materials having one or more thermally developable imaging layers on both sides of the support) are preferably used in combination with two intensifying screens, one screen in the "front" and one screen in the "back" of the material.

The imaging assemblies of the present invention are composed of a photothermographic material as defined herein (particularly one sensitive to X-radiation or visible light) and one or more phosphor intensifying screens adjacent the front and/or back of the material. The screens are typically designed to absorb X-rays and to emit electromagnetic radiation having a wavelength greater than 300 nm.

There are a wide variety of phosphors known in the art that can be formulated into phosphor intensifying screens, including but not limited to, the phosphors described in *Research Disclosure*, Vol. 184, August 1979, item 18431, Section IX, X-ray Screens/Phosphors, (noted above), hafnium containing phosphors (noted above), as well as those described in U.S. Pat. No. 4,835,397 (Arakawa et al.), U.S. Pat. No. 5,381,015 (Dooms), U.S. Pat. No. 5,464,568 (Bringley et al.), U.S. Pat. No. 4,226,653 (Brixner), U.S. Pat. No. 5,064,729 (Zegarski), U.S. Pat. No. 5,250,366 (Nakajima et al.), and U.S. Pat. No. 5,626,957 (Benso et al.), U.S. Pat. No. 4,368,390 (Takahashi et al.), U.S. Pat. No. 5,227,253 (Takasu et al.), the disclosures of which are all incorporated herein by reference for their teaching of phosphors and formulation of phosphor intensifying screens.

Phosphor intensifying screens can take any convenient form providing they meet all of the usual requirements for use in radiographic imaging, as described for example in U.S. Pat. No. 5,021,327 (Bunch et al.), incorporated herein by reference. A variety of such screens are commercially available from several sources including but not limited to, LANEX®, X-SIGHT® and InSight® Skeletal screens all available from Eastman Kodak Company. The front and back screens can be appropriately chosen depending upon the type of emissions desired, the desired photicity, emulsion speeds, and percent crossover. A metal (such as copper or lead) screen can also be included if desired.

Imaging assemblies can be prepared by arranging a suitable photothermographic material in association with one or more phosphor intensifying screens, and one or more metal screens in a suitable holder (often known as a cassette), and appropriately packaging them for transport and imaging uses.

Constructions and assemblies useful in industrial radiography include, for example, U.S. Pat. No. 4,480,024 (Lyons et al), U.S. Pat. No. 5,900,357 (Feumi-Jantou et al.), and EP 1 350 883 A1 (Pesce et al.).

Materials and Methods for the Examples:

All materials used in the following examples are readily available from standard commercial sources, such as Aldrich Chemical Co. (Milwaukee, Wis.) unless otherwise specified. All percentages are by weight unless otherwise indicated. The following additional materials were prepared and used as follows.

Compound A-1 is the chloride salt of the reaction product of acrylic acid and phthalazine. It is shown as compound (I-1) in copending and commonly assigned U.S. Ser. No. 10/281,525 (filed Oct. 28, 2002 by Ramsden and Zou), noted above. It is believed to have the structure shown below.

A-1

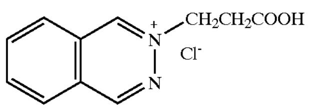

Bisvinyl sulfonyl methane (VS-1) is 1,1'(methylene-bis (sulfonyl))bis-ethene. It can be prepared as described in EP 0 640 589 A1 (Gathmann et al.) and is believed to have the structure shown below.

VS-1

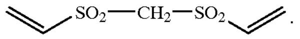

Preparation of Triazine-Thione Compounds:

Triazine-thione compounds can be prepared by the reaction of thiourea, an amine, and two equivalents of an aldehyde. For example, compound I-17 can be prepared by reaction of thiourea and cyclohexylamine with two equivalents of formaldehyde. The other compounds used in the following examples, that is, compounds I-1, I-16, I-24, and I-35 can be prepared in similar fashion or by using the teaching provided in the references noted in the "Toner Section."

EXAMPLES 1–6

Preparation of Silver Benzotriazole Salt Dispersion:

A stirred reaction vessel was charged with 85 g of lime-processed gelatin, 25 g of phthalated gelatin, and 2000 g of deionized water. A solution containing 185 g of benzotriazole, 1405 g of deionized water, and 680 g of 2.5 molar sodium hydroxide was prepared (Solution B). The mixture in the reaction vessel was adjusted to a pAg of 7.25 and a pH of 8.0 by addition of Solution B, and 2.5 molar sodium hydroxide solution as needed, and maintaining it at temperature of 36° C. A solution containing 228.5 g of silver nitrate and 1222 g of deionized water (Solution C) was added to the kettle at the accelerated flow rate defined by: Flow=16(1+0.002t$^2$) ml/min (where t is the time in minutes), and the pAg was maintained at 7.25 by a simultaneous addition of Solution B. This process was terminated when Solution C was exhausted, at which point a solution of 80 g of phthalated gelatin and 700 g of deionized water at 40° C. was added to the kettle. The mixture was then stirred and the pH was adjusted to 2.5 with 2 molar sulfuric acid to coagulate the silver salt emulsion. The coagulum was washed twice with 5 liters of deionized water, and re-dispersed by adjusting pH to 6.0 and pAg to 7.0 with 2.5 molar sodium hydroxide solution and Solution B. The resulting silver salt dispersion contained fine particles of silver benzotriazole salt.

Preparation of Tabular Grain Silver Halide Emulsions:

A vessel equipped with a stirrer was charged with 6 liters of water containing 4.21 g of lime-processed bone gelatin, 4.63 g sodium bromide, 37.65 mg of potassium iodide, an antifoamant, and 1.25 ml of 0.1 molar sulfuric acid. It was then held at 39° C. for 5 minutes. Simultaneous additions were then made of 5.96 ml of 2.5378 molar silver nitrate and 5.96 ml of 2.5 molar sodium bromide over 4 seconds. Following nucleation, 0.745 ml of a 4.69% solution of sodium hypochlorite was added. The temperature was increased to 54° C. over 9 minutes. After a 5-minute hold, 100 g of oxidized methionine lime-processed bone gelatin in 1.412 liters of water containing additional antifoamant at 54° C. were then added to the reactor. The reactor temperature was held for 7 minutes, after which 106 ml of 5 molar sodium chloride containing 2.103 g of sodium thiocyanate was added. The reaction was continued for 1 minute. During the next 38 minutes, the first growth stage took place wherein solutions of 0.6 molar $AgNO_3$, 0.6 molar sodium bromide, and a 0.29 molar suspension of silver iodide (Lippmann) were added to maintain a nominal uniform iodide level of 4.2 mole %. The flow rates during this growth segment were increased from 9 to 42 ml/min (silver nitrate) and from 0.8 to 3.7 ml/min (silver iodide). The flow rates of the sodium bromide were allowed to fluctuate as needed to maintain a constant pBr. At the end of this growth segment 78.8 ml of 3.0 molar sodium bromide were added and held for 3.6 minutes. During the next 75 minutes the second growth stage took place wherein solutions of 3.5 molar silver nitrate and 4.0 molar sodium bromide and a 0.29 molar suspension of silver iodide (Lippmann) were added to maintain a nominal iodide level of 4.2 mole %. The flow rates during this segment were increased from 8.6 to 30 ml/min (silver nitrate) and from 4.5 to 15.6 ml/min (silver iodide). The flow rates of the sodium bromide were allowed to fluctuate as needed to maintain a constant pBr.

During the next 15.8 minutes, the third growth stage took place wherein solutions of 3.5 molar silver nitrate and 4.0 molar sodium bromide and a 0.29 molar suspension of silver iodide (Lippmann) were added to maintain a nominal iodide level of 4.2 mole %. The flow rates during this segment were 35 ml/min (silver nitrate) and 15.6 ml/min (silver iodide). The temperature was decreased to 47.8° C. during this segment.

During the next 32.9 minutes, the fourth growth stage took place wherein solutions of 3.5 molar silver nitrate and 4.0 molar sodium bromide and a 0.29 molar suspension of silver iodide (Lippmann) were added to maintain a nominal iodide level of 4.2 mole %. The flow rates during this segment were held constant at 35 ml/min (silver nitrate) and 15.6 ml/min (silver iodide). The temperature was decreased to 35° C. during this segment.

A total of 12 moles of silver iodobromide (4.2% bulk iodide) were formed. The resulting emulsion was coagulated using 430.7 g of phthalated lime-processed bone gelatin and washed with de-ionized water. Lime-processed bone gelatin (269.3 g) was added along with a biocide and pH and pBr were adjusted to 6 and 2.5 respectively.

The resulting emulsion was examined by Scanning Electron Microscopy. Tabular grains accounted for greater than 99% of the total projected area. The mean ECD of the grains was 2.369 μm. The mean tabular thickness was 0.062 μm.

This emulsion was further sensitized using a combination of a gold sensitizer (potassium tetrachloroaurate) and a sulfur sensitizer (compound SS-1 as described in U.S. Pat. No. 6,296,998 of Eikenberry et al.) at 60° C. for 10 minutes, and 1.0 mmol of blue sensitizing dye SSD-1 (shown below) per mole of silver halide was added before the chemical sensitizers.

SSD-1

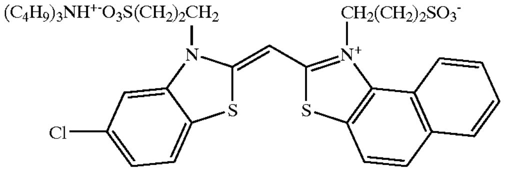

Preparation of Photothermographic Imaging Layer:

Photothermographic emulsions were prepared containing the components in the TABLE I. Each formulation was coated as a single layer on a 7 mil (178 μm) transparent, blue-tinted poly(ethylene terephthalate) film support using a conventional knife coating machine. Samples were dried at 133° F. (56.11° C.) for 7 minutes.

TABLE I

| Component | Dry Coverage |
|---|---|
| Silver benzotriazole | 4.23 g/m$^2$ |
| AgBrI tabular grains | 0.67 g/m$^2$ |
| Sodium benzotriazole | 0.12 g/m$^2$ |
| 3-Methylbenzothiazolium iodide | 0.08 g/m$^2$ |
| Succinimide | 0.12 g/m$^2$ |
| VS-1 | 0.09 g/m$^2$ |
| 1,3-Dimethylurea | 0.12 g/m$^2$ |
| Triazine-Thione compound | 0.05 g/m$^2$ |
| L-Ascorbic acid | 1.79 g/m$^2$ |
| A-1 | 0.06 g/m$^2$ |
| Lime processed gelatin | 2.41 g/m$^2$ |

The resulting photothermographic films were imagewise exposed for $10^{-2}$ second using an EG&G flash sensitometer equipped with a P-16 filter and a 0.7 neutral density filter. Following exposure, the films were developed by heating on a heated drum for 4 to 20 seconds at 140° C. to 150° C. to generate continuous tone wedges.

Densitometry measurements were made on a custom built computer-scanned densitometer and meeting ISO Standards 5-2 and 5-3 and are believed to be comparable to measurements from commercially available densitometers. Density of the wedges were then measured with a computer densitometer using a filter appropriate to the sensitivity of the photothermographic material to obtain graphs of density versus log exposure (that is, D log E curves). $D_{min}$ is the density of the non-exposed areas after development and it is the average of the eight lowest density values.

EXAMPLES 1–6

Examples 1–6, shown below in TABLE II, demonstrate that the addition of triazine-thione compounds within the present invention to photothermographic materials resulted in improved density and shortened processing time and temperature. A Control material (C-1) was similarly prepared but the triazine-thione compound was omitted. It provided images with very low density.

TABLE II

| Example | Compound | Development Time (sec) | Development Temperature ° C. | $D_{min}$ | $D_{max}$ | Relative Speed |
|---|---|---|---|---|---|---|
| 1 | I-1 | 5 | 150 | 0.47 | 3.07 | 120 |
| 2 | I-1 | 8 | 140 | 0.35 | 2.02 | 105 |
| 3 | I-16 | 12 | 140 | 0.34 | 2.27 | 114 |
| 4 | I-17 | 5 | 150 | 0.44 | 2.15 | 109 |
| 5 | I-24 | 4 | 150 | 0.56 | 2.02 | 100 |
| 6 | I-35 | 4 | 150 | 0.47 | 2.16 | 100 |
| C-1 | None | 20 | 150 | 0.31 | 0.49 | — |

"Relative Speed" was determined at a density value of 0.25 above $D_{min}$. Speed values were normalized assigning sample I-35 a speed of 100.

EXAMPLES 7–9

The following example demonstrates the use of triazine-thione compounds within the present invention in thermographic materials Preparation of Thermographic Imaging Materials Thermographic emulsion and topcoat formulations were prepared containing the components in TABLES IV and V. The thermographic formulation was coated onto a 7 mil (178 μm) transparent, blue-tinted poly(ethylene terephthalate) film support using a conventional knife coating machine and dried at 95° F. (35° C.) for 7.5 minutes. The topcoat formulation was coated onto the dried thermographic layer and also dried at 95° F. (35° C.) for 7.5 minutes.

TABLE IV

Thermographic Emulsion Layer

| Component | Dry Coverage |
|---|---|
| Lime processed gelatin | 3.20 g/m$^2$ |
| Silver benzotriazole | 3.70 g/m$^2$ |
| Sodium benzotriazole | 0.88 g/m$^2$ |
| 3-Methylbenzothiazolium iodide | 0.07 g/m$^2$ |

TABLE V

Topcoat Layer

| Component | Dry Coverage |
|---|---|
| Polyvinyl Alcohol | 2.25 g/m$^2$ |
| VS-1 | 0.11 g/m$^2$ |
| Succinimide | 0.15 g/m$^2$ |
| 1,3-Dimethylurea | 0.15 g/m$^2$ |
| L-Ascorbic acid | 2.18 g/m$^2$ |
| A-1 | 0.07 g/m$^2$ |
| Triazine-Thione Compound | 0.06 g/m$^2$ |

Evaluation of Thermographic Imaging Materials

The thermographic material was cut into 8 inch×1 inch strips (20.32 cm×2.54 cm). The strips were developed by heating on a heated drum for 15 seconds at 150° C. The density of both imaged and non-imaged strips was measured as described in Examples 1–6 above. The results, shown below in TABLE VII indicate that thermographic materials containing triazine-thione compounds of this invention provide dense black images.

TABLE VII

| Example | Triazine-Thione Compound | Nonimaged Density | Imaged Density |
|---|---|---|---|
| 7 | I-1 | 0.20 | 2.39 |
| 8 | I-24 | 0.20 | 2.29 |
| 9 | I-35 | 0.20 | 2.53 |

The invention has been described in detail with particular reference to certain preferred embodiments thereof, but it will be understood that variations and modifications can be effected within the spirit and scope of the invention.

We claim:

1. A thermally developable composition comprising a non-photosensitive source of reducible silver ions, and a triazine-thione compound represented by the following Structure (I):

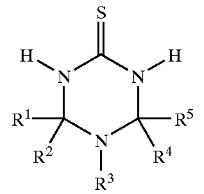

(I)

wherein $R^1$, $R^2$, $R^3$, $R^4$, and $R^5$, independently represent a substituent attached to the triazine-thione ring by a single bond.

2. The thermally developable composition of claim 1 wherein $R^1$, $R^2$, $R^4$, and $R^5$ each individually represent hydrogen, alkyl groups, cycloalkyl groups, alkenyl groups, alkynyl groups, aralkyl groups, aryl groups, aromatic or non-aromatic heterocyclic groups, or divalent, trivalent, or tetravalent linking groups, and $R^3$ represents hydrogen, an alkyl group, a cycloalkyl group, an alkenyl group, an alkynyl group, an aralkyl group, an aryl group, an aromatic or non-aromatic heterocyclic group, an alkoxy group, an aryloxy group, an alkyl(or aryl)-$SO_2$— group, an alkyl(or aryl)-SO— group, an alkyl(or aryl)-(C═O)— group, an alkyl(or aryl)-(C═O)O— group, an alkyl(or aryl)-O(C═O)— group, or a R"R'"N(C═O)— or R"R'"$NSO_2$— group wherein R" and R'" are independently hydrogen, alkyl, or aryl groups, or $R^3$ is a divalent, trivalent, or tetravalent linking group.

3. The thermally developable composition of claim 1 wherein $R^1$, $R^2$, $R^3$, $R^4$, and $R^5$ individually represent hydrogen, alkyl groups, cycloalkyl groups, carboxyalkyl groups, hydroxyalkyl groups, alkylene linking groups, phenyl groups, or alkylene oxide linking groups.

4. The thermally developable composition of claim 3 wherein $R^1$, $R^2$, $R^4$, and $R^5$ are each hydrogen.

5. The thermally developable composition of claim 1 wherein said triazine-thione compound is represented by one or more of the following Compounds I-1 to I-68:

(I-1)
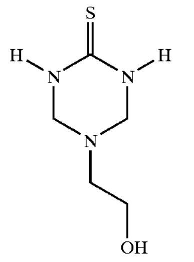
(I-2)
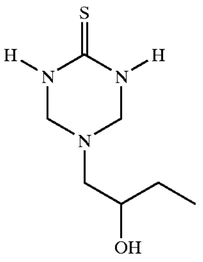
(I-3)
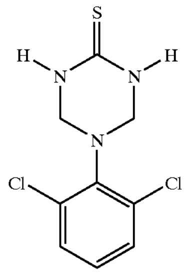
(I-4)
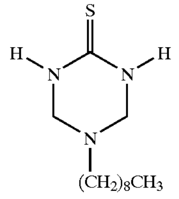
(I-5)
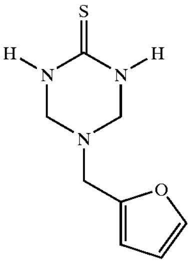
(I-6)
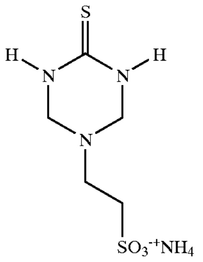
-continued
(I-7)
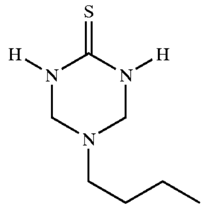
(I-8)
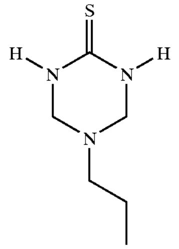
(I-9)
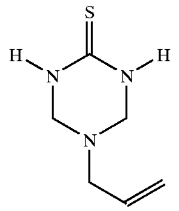
(I-10)
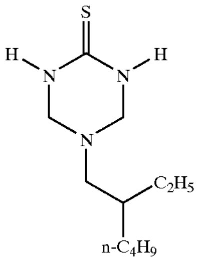
(I-11)
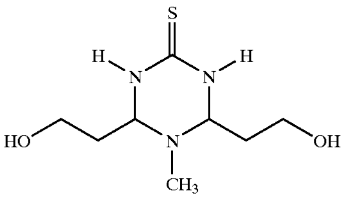
(I-12)
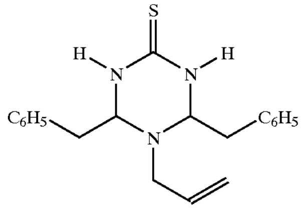
(I-13)
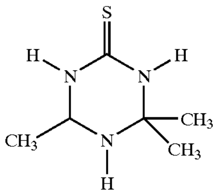

-continued
(I-14)
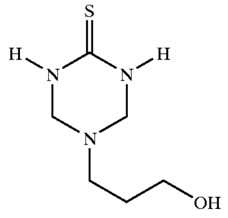
(I-15)
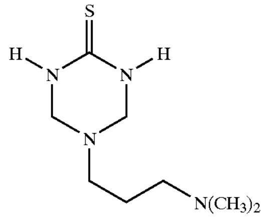
(I-16)
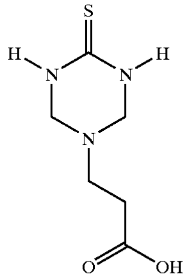
(I-17)
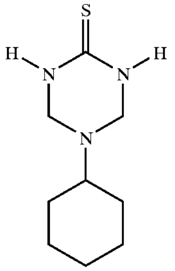
(I-18)
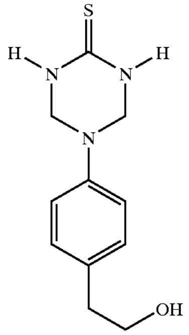
(I-19)
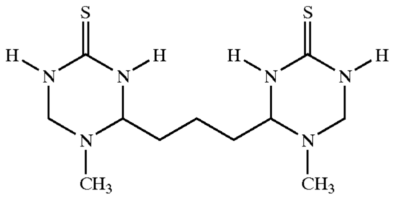
-continued
(I-20)
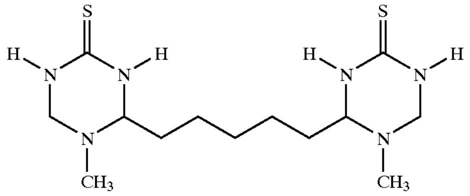
(I-21)
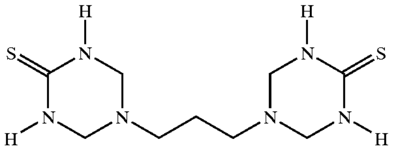
(I-22)
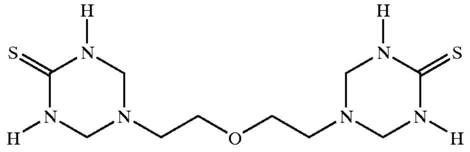
(I-23)
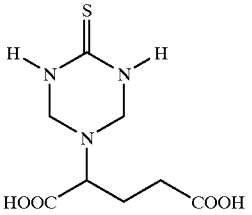
(I-24)
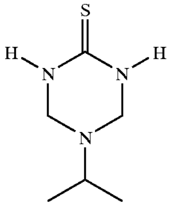
(I-25)
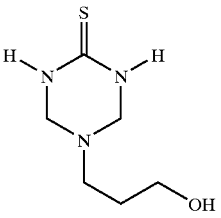
(I-26)
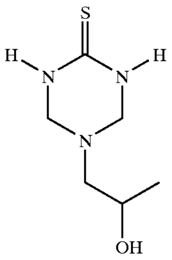

-continued
(I-27)
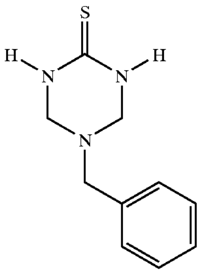
(I-28)
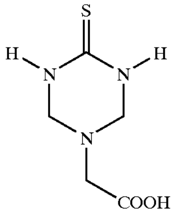
(I-29)
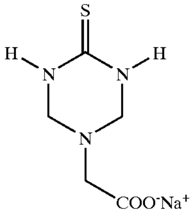
(I-30)
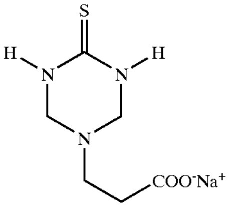
(I-31)
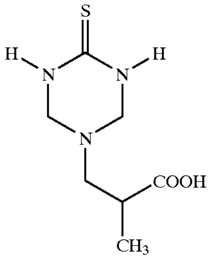
(I-32)
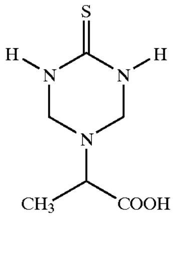
-continued
(I-33)
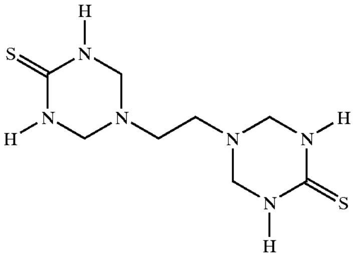
(I-34)
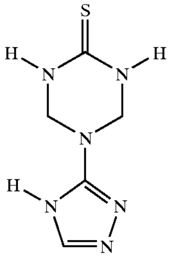
(I-35)
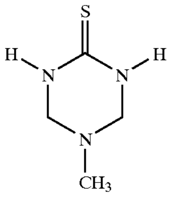
(I-36)
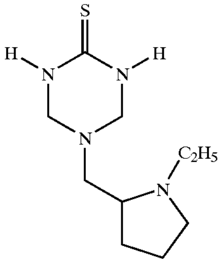
(I-37)
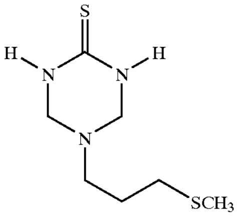
(I-38)
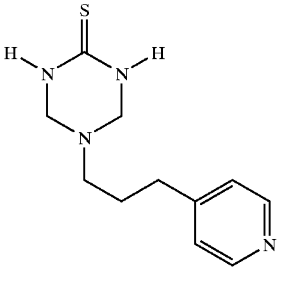

-continued
(I-39)
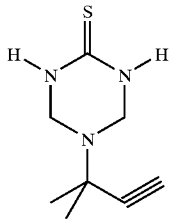
(I-40)
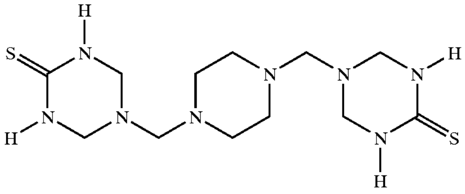
(I-41)
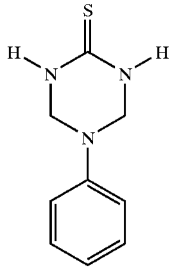
(I-42)
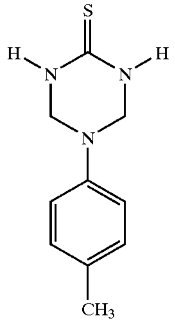
(I-43)
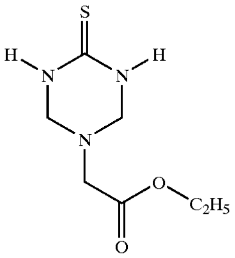
(I-44)
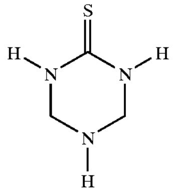
-continued
(I-45)
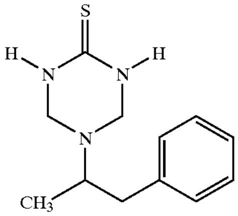
(I-46)
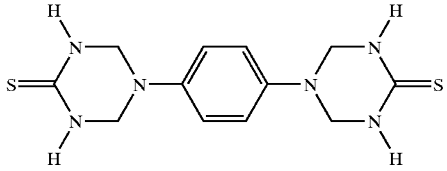
(I-47)
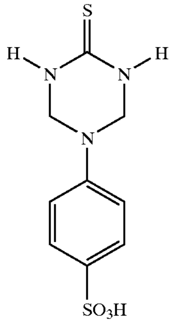
(I-48)
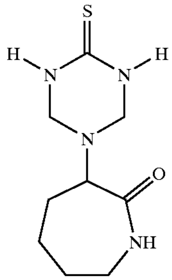
(I-49)
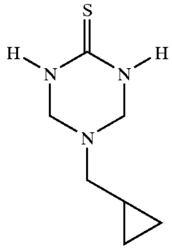
(I-50)
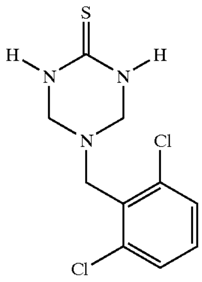

-continued
(I-51)
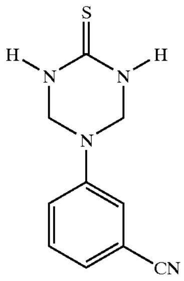
(I-52)
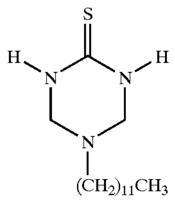
(I-53)
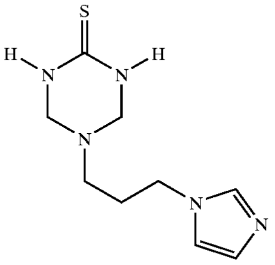
(I-54)
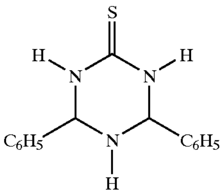
(I-55)
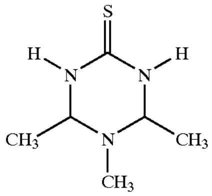
(I-56)
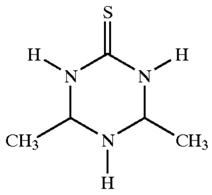
(I-57)
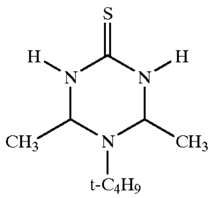
-continued
(I-58)
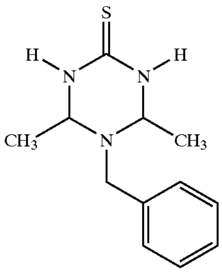
(I-59)
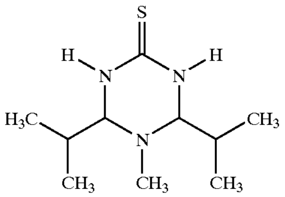
(I-60)
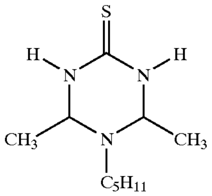
(I-61)
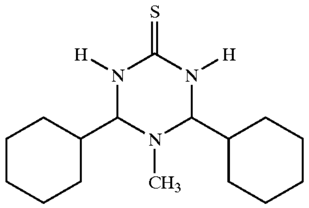
(I-62)
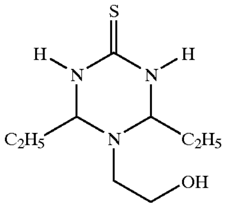
(I-63)
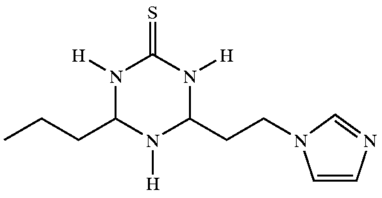
(I-64)
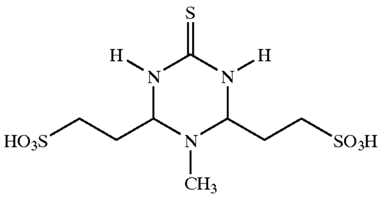

-continued (I-65)

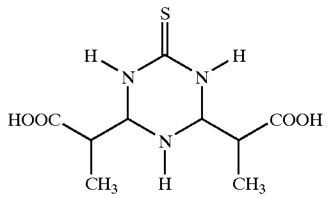

(I-66)

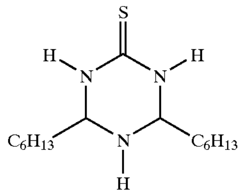

(I-67)

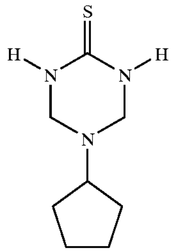

(I-68)

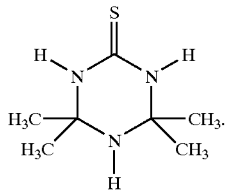

6. The thermally developable composition of claim 1 wherein said non-photosensitive source of reducible silver ions is an organic silver salt other than a silver carboxylate.

7. The thermally developable composition of claim 1 wherein said non-photosensitive source of reducible silver ions is a silver salt of a compound containing an imino group.

8. The thermally developable composition of claim 7 wherein said non-photosensitive source of reducible silver ions is a silver salt of benzotriazole or a substituted derivative thereof, or mixtures of such silver salts.

9. The thermally developable composition of claim 1 that is an aqueous-based composition and further comprises predominantly one or more hydrophilic binders or a polymeric latex.

10. The thermally developable composition of claim 9 comprising predominantly one or more hydrophilic binders that are gelatin or gelatin derivatives, polyvinyl alcohol, or cellulosic materials.

11. The thermally developable composition of claim 1 that is photosensitive and further comprises a photosensitive silver halide.

12. The thermally developable composition of claim 11 comprising one or more preformed photosensitive silver halides.

13. The thermally developable composition of claim 11 comprising a photosensitive silver halide that is provided as tabular grains.

14. The thermally developable composition of claim 1 further comprising a reducing agent composition that comprises a hindered phenol or an ascorbic acid.

15. A thermally developable material comprising a support and having thereon at least one thermally developable layer, and comprising a triazine-thione compound represented by the following Structure (I):

(I)

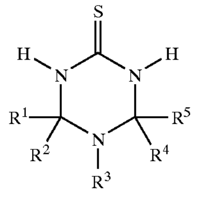

wherein $R^1$, $R^2$, $R^3$, $R^4$, and $R^5$, independently represent a substituent attached to the triazine-thione ring by a single bond.

16. The thermally developable material of claim 15 wherein $R^1$, $R^2$, $R^3$, $R^4$, and $R^5$ individually represent hydrogen, alkyl groups, cycloalkyl groups, carboxyalkyl groups, hydroxyalkyl groups, alkylene linking groups, phenyl groups, or alkylene oxide linking groups.

17. The thermally developable material of claim 15 that is photosensitive and further comprises a photosensitive silver halide in one or more thermally developable layers, and said triazine-thione compound is present in the same layer as said photosensitive silver halide.

18. A black-and-white thermographic material that comprises a support having thereon one or more thermally-developable imaging layers comprising a binder and in reactive association, a non-photosensitive source of reducible silver ions, and a reducing composition for said non-photosensitive source of reducible silver ions, and a triazine-thione compound represented by the following Structure (I):

(I)

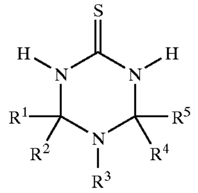

wherein $R^1$, $R^2$, $R^3$, $R^4$, and $R^5$, independently represent a substituent attached to the triazine-thione ring by a single bond.

19. A method of forming a visible image comprising:

A) thermal imaging of the thermographic material of claim 18.

20. The method of claim 19 wherein said the thermographic material comprises a transparent support, and said image-forming method further comprises:

B) positioning said thermally imaged thermographic material between a source of imaging radiation and an imageable material that is sensitive to the imaging radiation, and C) exposing said imageable material to the imaging radiation through the visible image in said thermally imaged thermographic material to provide an image in the imageable material.

* * * * *